(12) United States Patent
Braun et al.

(10) Patent No.: US 8,346,650 B2
(45) Date of Patent: *Jan. 1, 2013

(54) COMPUTER SYSTEM FOR PROCESSING DATA RELATED TO RISKS ASSOCIATED WITH FINANCIAL INSTRUMENTS

(75) Inventors: David Braun, Glastonbury, CT (US); Eric Clapprood, Granby, CT (US); Daniel R. Guilbert, Simsbury, CT (US); Nicholas Mocciolo, Manchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/309,266

(22) Filed: Dec. 1, 2011

(65) Prior Publication Data

US 2012/0078816 A1  Mar. 29, 2012

Related U.S. Application Data

(63) Continuation of application No. 12/004,413, filed on Dec. 20, 2007, now Pat. No. 8,073,758.

(60) Provisional application No. 60/962,263, filed on Jul. 27, 2007.

(51) Int. Cl.
*G06Q 40/00* (2006.01)
(52) U.S. Cl. ........................................ 705/36 R; 705/4
(58) Field of Classification Search .................... 705/35, 705/4, 36 R
See application file for complete search history.

(56) References Cited

U.S. PATENT DOCUMENTS

| | | |
|---|---|---|
| 6,405,179 B1 | 6/2002 | Rebane |
| 2002/0046053 A1* | 4/2002 | Hare et al. ........................ 705/1 |
| 2002/0103852 A1* | 8/2002 | Pushka ........................ 709/203 |
| 2006/0122871 A1 | 6/2006 | Cowley et al. |
| 2007/0162365 A1 | 7/2007 | Weinreb |
| 2009/0024478 A1* | 1/2009 | Dixon et al. .................... 705/14 |
| 2009/0192829 A1 | 7/2009 | Long et al. |

* cited by examiner

*Primary Examiner* — Ojo O Oyebisi
(74) *Attorney, Agent, or Firm* — Howard IP Law Group, PC

(57) ABSTRACT

The present invention provides a method and system for re-allocating financial risks. The system includes computer modules for assessing the behavior of a financial product by a financial institution, modeling the risks associated with providing the financial product by the financial institution, assessing the market risks associated with providing the financial product by a derivative counterparty and assuming, by the derivative counterparty, market risks associated with providing the financial product.

20 Claims, 15 Drawing Sheets

COMPUTER SYSTEM FOR PROCESSING DATA RELATED TO RISKS ASSOCIATED WITH FINANCIAL INSTRUMENTS

CROSS-REFERENCE TO RELATED APPLICATIONS

This application is a continuation application of co-pending U.S. patent application Ser. No. 12/004,413 entitled RISK MANAGEMENT SYSTEM, filed Dec. 20, 2007, which application claims priority to U.S. Provisional Patent Application Ser. No. 60/962,263, filed Jul. 27, 2007, the entire contents of all of which are herein incorporated by reference for all purposes.

FIELD OF THE INVENTION

The present invention generally relates to systems for financial risk management. More specifically, the present invention discloses a novel system for redistribution of risks involved in certain financial liabilities.

BACKGROUND OF THE INVENTION

Often, individuals will seek to guarantee a steady stream of income for situations when their regular income is either diminished or altogether unavailable (e.g. retirement, times of financial hardship, etc). Additionally, individuals may make an investment in order to expand their income at a later date. In such cases, these individuals will often invest their existing funds, in order to guarantee a stream of payments of the invested amount, as well as to receive return from the investment at a later time. This type of investment is generally known as an "annuity."

An individual investing in an annuity (and upon whose life the income payments will be based) is known as an "annuitant." The individual receiving payments from the annuity is known as the "contract owner." The contract owner and the annuitant are often but not necessarily the same individual.

The annuity has two phases: an accumulation phase, during which the contract builds a cash value and money is added, and a payout phase, during which the funds are distributed. An annuitant may choose to purchase an annuity with a lump sum, or may make continuous payments into an annuity fund. Regardless of the payment method chosen by the annuitant, the financial or insurance institution offering an annuity will begin making periodic payments to and stop receiving funds from the annuitant on a predetermined date, this is known as "annuitization."

Two common types of annuities are known as fixed annuities ("FA") and variable annuities ("VA"). Upon annuitization, fixed annuities offer payments of predetermined value, or of sums that increase by a set percentage. Conversely, upon annuitization, variable annuities offer payments determined by the performance of a particular investment option (e.g. bonds).

With a variable annuity, the annuity contract owner bears the investment risk. The relevant life typically has a choice of investment options in which he/she can direct where the annuity deposits will be invested. These various investment options, or sub-accounts, may include stocks, bonds, money market instruments, mutual funds and the like.

Since the yield of a variable annuity is dependent on the specific sub-accounts, the risk involved in purchasing a variable annuity is proportional to the risk involved in investing in the underlying sub-accounts. While a potential annuitant may be interested in a specific investment option, the risk involved over a long period of time before annuitization may be unappealing. In such a case, the financial institution or insurance company offering the variable annuity product may elect to guarantee a certain minimum return on the annuitant's investment. Similarly, insurance companies and financial institutions seeking to sell or insure other financial products having some risk may offer guarantees or insurance on the performance of the financial products. Thus, the financial or insurance institution would assume some of the risk involved in purchasing a variable annuity product or other non-insurance financial product.

Variable annuity contracts can also provide a death benefit. Usually, during the accumulation period, this death benefit is related to the value of the underlying sub-accounts, or contract value. That is, if the sub-accounts backing the contract value have performed poorly, then the death benefit may be reduced to an insignificant amount. After annuitization, the death benefit can be a function of the remaining payments of the annuity at the time of the relevant life's death.

Annuity contracts may also provide guarantees in several different variations. A Guaranteed Minimum Death Benefit ("GMDB") is a guarantee that provides a minimum benefit at the death of the relevant life regardless of the performance of the underlying investments. A Guaranteed Minimum Income Benefit ("GMIB") is a guarantee that will provide a specified minimum income amount at the time the contract is annuitized. The income payment will be dependent on previously stated details set out in the contract.

A Guaranteed Minimum Accumulation Benefit ("GMAB") is a benefit that guarantees a specified minimum contract value at a certain date in the future, even if actual investment performance of the contract is less than the guaranteed amount. A Guaranteed Minimum Withdrawal Benefit ("GMWB") is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider (as described below). Further, if the annuity contract does not provide a guarantee (e.g. GMIB, GMWB, etc.), the contract will terminate when the contract value goes to $0 or some other amount specified in the contract.

The guarantees form a class of liabilities collectively referred to as variable annuity guaranteed benefits ("VAGB"). These guarantees are known as "riders." The contract holder can purchase riders in order to guarantee a certain minimum performance criteria for underlying separate accounts. To the extent that the underlying investments do not perform in such a way so that the minimum criteria are met, the writing insurance company must subsidize the difference between the minimum performance that the VAGB guarantees and the actual performance of the underlying sub-accounts.

VAGBs can be further subdivided into several different categories, which are shown in FIG. 1. Two common categories of VAGBs 104 are variable annuity guaranteed minimum death benefits ("VAGMDB") 106 and variable annuity guaranteed living benefits ("VAGLB") 108.

The VAGMDB 106 is commonly implemented as one of the following three (3) manifestations: return of premium death benefits ("ROPDB") 110, high watermark and/or periodic ratchet death benefits ("HWDB/PRDB") 112, and earnings enhancement death benefits ("EEDB").

The VAGLB 108 is commonly implemented as one the following three (3) manifestations: variable annuity guaranteed minimum accumulation benefits ("GMAB") 116, variable annuity guaranteed minimum income benefits ("GMIB") 118, and variable annuity guaranteed minimum withdrawal benefits ("GMWB") 120. This is not intended as an exhaustive list, but rather, a broad overview of the general trend of VAGBs currently available.

As previously discussed, two types of VAGBs are VAGMDB and VAGLB. The fundamental difference between VAGMDBs and VAGLBs is that the former requires that the annuitant die in order for the contract holder to realize the incremental value afforded by the guarantee. On the contrary, VAGLBs permit the contract holder to realize some or all of the benefit of the guarantee while the annuitant is living.

Naturally, regardless of the specific form taken by a particular VAGB, there is significant risk that the underlying sub-accounts perform in a manner that is inadequate to meet the minimum performance criteria. Financial and insurance institutions offering VAs are often interested in decreasing the risks entailed in the sale of a variable annuity.

Historically, many financial and insurance institutions have purchased reinsurance in an attempt to share the risk that there will be inadequate funds available to cover these guarantees, or to spread any risks associated with purchase or investment in other financial products. Typically, reinsurance companies spread risks by pooling the risks of multiple companies and contracts. Specifically, insurance companies pay a premium to cede a portion of their risk so that if losses are above a negotiated amount, the reinsurance company will reimburse the insurance company for these excess losses. Since the reinsurance company assumes risks from multiple companies, any losses incurred from business assumed from one insurance company are expected to be outweighed by profits from another company, thus allowing the reinsurance company to make a profit. Over the years, most reinsurers have withdrawn from providing coverage for variable annuity contracts having features such as those described above because of the high correlation among the contracts, and thus the risk could not be mitigated by pooling risks from multiple companies. Because of the inability of insurance companies to reinsure variable annuity contracts, they incurred large economic losses during the stock market decline from 2000 to 2002. Similarly, financial products such as credit card receivable derivatives and mortgage backed securities, or the like, may have the bulk of the underlying securities subject to similar risks that may affect the financial product as a whole.

Another method of mitigating these risks is known as a "hedge," while investing in a hedge is known as "hedging." To protect the variable annuity contract holders, and to ensure the claims-paying ability of the writing insurance company, hedging programs are often maintained by insurance carriers to offset the risk associated with the riders.

Hedging is a strategy that entails making an investment, the gains of which will offset the losses of a business risk, thus allowing the hedging entity to benefit from a gain involved in a particular business transaction while offsetting losses. Commonly, hedging is used to diminish the risk factors involved in a specific investment, but can also be used to manage the risks involved in guaranteeing a minimum income to an annuitant on a variable annuity, or for a group of annuitants whose variable annuities depend on the same or similar factors. Similarly, for other financial products, hedging may be used to manage the risk involving the value of the asset backing the financial product.

Various strategies are being employed to manage GMWB and GMDB risks, or the risks of other financial products: (a) Delta hedging (uncertain effectiveness since a GMWB's exposure to "vega" (implied volatility) is not hedgeable with futures, and substantial EPS (earnings per share) and economic risks remain); (b) Multi-greek hedging with futures and vanilla options (reasonably effective to hedge economic and EPS exposure over intermediate term and stable markets, but long term effectiveness is uncertain due to cost and exposure to second and third order risks); and (c) Multi-greek hedging with futures, vanilla options, and exotic equity options (reasonably effective to hedge EPS exposure over intermediate term and stable markets, but long term effectiveness is not well understood).

Hedging programs can vary significantly but, generally proceed according to the following pseudo-algorithm:

Construction of a mathematical valuation model to compute an estimate of the value of the written guarantee liability, conditional upon a set of relevant capital markets data and assumptions for annuitant behavior.

Gathering required capital markets data, dependent upon the structure of the guarantee and the contractually permissible set of investment options, but generally including:

The spot price of relevant equity indices.

The term structure of interest rates denominated in all of the currencies that are reflected in the valuation model.

The spot price of relevant cross-currency exchange rates associated with all of the currency pairs that are reflected in the valuation model.

The forward implied dividend curves for each of the relevant equity indices.

A sub-model for the volatility associated with the price of the equity indices.

A sub-model for the volatility associated with the relevant cross-currency exchange rates.

A sub-model for the volatility associated with the interest rates of all relevant term structures.

Formulating assumptions of annuitant behavior, dependent upon the structure of the guarantee, but generally including:

Assumed rates of mortality for individual annuitants, or a sub-model for stochastic mortality.

Assumed rates of lapsation for individual annuitants and/or a predefined algorithm (deterministic or stochastic) for future lapsation rates that is a function of other variables in the valuation (so-called "dynamic lapsation").

Assumed rates of utilization for behavioral choices granted to the contract holder under the terms of the guarantee, such as size and frequency of periodic withdrawal of funds from the variable annuity contract and/or a predefined algorithm (deterministic or stochastic) for future utilization that is a function of other variables in the valuation ("dynamic utilization").

Size, style and frequency of transfer of funds between investment options and/or a predefined algorithm (deterministic or stochastic) for future transfers that is a function of other variables in the valuation.

Defining a series of sets of unexpected fluctuations ("shocks") to be applied to capital markets data.

Running the valuation model and computing an estimate of the valuation of the written liability under the "base case" market data and under each set of shocks. This information can be used to determine an estimate of the base valuation of the written liability and of the sensitivities of the valuation estimate to changes in specific capital markets data. (The estimate of the base valuation of the written liability and the estimate of the sensitivities of the valuation estimate to changes in specific capital markets data are known in the art as "Greeks").

Formulating a hedge portfolio and executing an analogous valuation/sensitivity exercise to calculate the base valuation and the Greeks.

Executing trades in the hedge portfolio that position the aggregated Greeks of the hedge portfolio to be within desired ranges relative to the liability Greeks.

Several useful notations are defined as follows:

$f_L^B$ is the liability valuation under the base case set of capital markets assumptions $\delta_L$ is the liability delta $\kappa_L$ is the liability vega $\rho_L$ is the liability rho.

Furthermore, it should be noted that the liability delta is defined as the sensitivity of the VAGB valuation to instantaneous changes in stock or stock index levels, the liability vega is defined as the sensitivity of the VAGB valuation to instantaneous changes in stock or stock index implied volatility levels, and the liability rho is defined as the sensitivity of the VAGB valuation to instantaneous changes in interest rates.

Additionally, there are innumerable other Greeks that can be defined and managed as part of a hedge program. Those may include the following additional metrics:

deltas with respect to foreign currency exchange rates,

"partial" or "bucket" vegas which are sensitivities of the VAGB valuation to implied volatilities of a specific tenor rather than to the implied volatility surface as a whole, "partial" or "key rate" rhos which are sensitivities of the VAGB valuation to interest rates of a specific tenor rather than to the entire yield curve in parallel, "correlation vegas" which are the sensitivities of the VAGB valuation to changes in the level of correlation between set of capital markets variables assumed to be stochastic, "theta," which is the sensitivity of the VAGB valuation to the passage of time, any number of higher-order sensitivities, and any number of cross-gammas.

Finally, it should be noted that the above is by no means meant to be an exhaustive list of all possible Greeks, but merely an illustrative description of some Greeks that may be instrumental in understanding the subject matter of the invention.

The following is an example of hedging the liability associated with a VA. Assuming a VA guarantee has been written on a VA contract in which the policyholder's funds are invested in a single asset, and supposing the writing insurance company wishes to implement a 3-Greek first order hedge to offset delta, vega, and rho risk. Let $f_L(x,y,z)$ be the liability valuation estimate computed after a hypothetical change to the underlying stock index of x, a hypothetical change to the underlying index volatility of y, and a hypothetical change to the underlying interest rate term structure of z.

In classic terminology, the three Greeks of the liability would be computed using a finite-differencing methodology as follows:

$f_L^B = f(0,0,0)$ $\delta_L = f_L(1,0,0) - f_L(0,0,0) = f_L(1,0,0) - f_L^B$ $\kappa_L = f_L(0,0.01,0) - f_L(0,0,0) = f_L(0,0.01,0) - f_L^B$ $\rho_L = f_L(0,0,0.0001) - f_L(0,0,0) = f_L(0,0,0.0001) - f_L^B$ Similar metrics can be calculated for a portfolio of hedging assets. Using analogous notation, a standard goal of a hedging program would be to formulate a portfolio of hedging assets that, minimally, meets the following criteria:

$|\delta_A - \delta_L| < \varepsilon_\delta$ and/or $\varepsilon_{\delta,1} < \frac{\delta_A}{\delta_L} < \varepsilon_{\delta,2}$ $|\kappa_A - \kappa_L| < \varepsilon_\kappa$ and/or $\varepsilon_{\kappa,1} < \frac{\kappa_A}{\kappa_L} < \varepsilon_{\kappa,2}$ $|\rho_A - \rho_L| < \varepsilon_\rho$ and/or $\varepsilon_{\rho,1} < \frac{\rho_A}{\rho_L} < \varepsilon_{\rho,2}$ Wherein, the $\varepsilon$ ("epsilon") represents tolerance imposed on the management of the portfolio. Notably, they need not be constant, although they are expressed that way above. The above examples demonstrate first-order hedging only in a 3-Greek framework, but similar exercises can and are performed related to higher-order Greeks and cross-gammas. That is, second-order Greeks and cross-gammas can be calculated using analogous finite differencing methodologies and analogous hedge tolerances can be defined. Furthermore, each of the above three equations represents the hedging of a different Greek (i.e. delta, vega, and rho). Additionally, the main difference between the first and second condition, in each of the above three equations, is whether the deviation in liability and asset Greeks is viewed on an absolute and/or a relative basis.

The motivation for Greek-matching is to produce gains or losses that offset losses or gains made on the liability. For example, suppose that the price of the underlying asset were to decrease by one. This would result in a change (generally a loss in the case of VA guarantees) of $\delta_L$. However, due to the construction of the asset portfolio, the hedges will experience a change in value (generally a gain in the case of VA guarantee hedges) of $\delta_A$. Since the hedging process ensures that the difference between $\delta_A$ and $\delta_L$ is small, the net economic impact on the company is also small, making the company reasonably indifferent to small changes in these capital market variables.

Among other factors, hedging effectiveness on VA guarantees using generic hedging instruments, known as "vanilla hedging instruments," is dependent upon the size, frequency and correlation of movements in critical capital markets variables. Generally, small changes in valuation inputs will not cause a hedge to materially lose effectiveness. Depending upon the nature of the guarantee written, as well as upon the exact instruments chosen for hedging, there are two characteristics of VA guarantee liabilities that cause hedging ineffectiveness in existing systems for guaranteeing benefits using hedging: 1) the instance where valuation inputs experience large and/or sudden changes, and 2) when several of the inputs move together.

Because current hedging programs are incomplete and uncertain, there is a clear need in the art for a system and method to more effectively redistribute the risk associated with variable annuities. The present invention overcomes the various deficiencies associated with traditional survival hedging programs.

SUMMARY OF THE INVENTION

The present invention comprises a method and system for distributing the risks associated with an insurance instrument (e.g. insurance policy) or a multitude of other financial products provided by an insurance provider to an individual or group. The method includes the steps of assessing the behavior of the insured individual by the insurance provider, modeling the risks associated with providing insurance to the individual by the insurance provider, assessing the market risks associated with providing the insurance policy by a derivative counterparty and assuming, by the derivative counterparty, market risks associated with providing the insurance instrument.

The system for distributing risks associated with an insurance policy issued by an insurance provider includes a data storage module for storing information associated with the insurance policy, a computing system in electronic communication with the data storage module and the insurance provider, the computing system including a risk assessment module for assessing the risks associated with the issuance of the insurance policy, the risks including behavior risks and market risks and a derivative counterparty for assuming the market risks.

In light of the foregoing, it is an object of the present invention to manage the risks involved in providing an insurance policy.

Furthermore, it is another object of the present invention to ensure that premiums received by an insurance provider are secured regardless of the performance of specific investment vehicles.

It is another object of the invention to provide a system for managing risks associated with an insurance instrument issued by an insurance provider. The system includes a data storage module for storing information associated with the insurance instrument, a computing system in electronic communication with the data storage module and the insurance provider, the computing system including a risk assessment module for assessing the risks associated with the issuance of the insurance instrument, the risks including behavior risks and market risks and an external party for assuming the market risks.

The computing system includes a display module, a data entry module, a processing module, a calculation module and one or more communication modules and is operated by a party separate from the insurance provider. The data storage module may be external to or internal to the insurance provider. The insurance instrument can be an insurance policy and the risks are calculated periodically. The system further includes a reporting module for producing reports of information associated with the insurance instrument, a communication module for passing the market risk to an external system and a second communication module for passing the risks associated with the issuance of the insurance instrument to a third party.

Yet another object of the invention is to provide a system for managing risks associated with an insurance instrument issued by an insurance provider. The system includes a data storage module for storing information associated with the insurance instrument, a computing system in electronic communication with the data storage module and the insurance provider, the computing system including a risk assessment module for assessing the risks associated with the issuance of the insurance instrument, the risks including behavior risks and market risks, wherein the market risks are transferred outside of the insurance provider.

The computing system includes a display module, a data entry module, a processing module, a calculation module and one or more communication modules. The data storage module may be external or internal to the insurance company.

The risks are calculated periodically and the insurance instrument may be an insurance policy or other risk mitigation guarantee. The system further includes a reporting module for producing reports of information associated with the insurance policies.

It is another object of the invention to provide a system for managing risks associated with an insurance instrument issued by an insurance provider. The system includes a data storage module for storing information associated with the investment instrument and a computing system in electronic communication with the data storage module and the derivative counterparty. The computing system includes a risk assessment module for assessing the risks associated with the investment instrument. The risks include market risks, and the market risks assumed by the derivative counterparty.

The computing system may be operated on by a party separate from the derivative counterparty. Furthermore, the computing system includes a display module, a data entry module, a processing module, a calculation module, a reporting module for producing reports of information associated with the investment instrument and one or more communication modules. The data storage module may be external or internal to the derivative counterparty.

The market risks may be calculated periodically. Additionally, the system may contain a second communication module for receiving the market risk data from an external system.

It is another object of the invention to provide a method for distributing the risks associated with an insurance instrument provided by an insurance provider to an individual or a group. The method includes the steps of assessing the behavior of the individual, group or underlying asset by the insurance provider, modeling the risks associated with providing insurance to the individual, group or underlying asset by the insurance provider, transferring the market risk to an external party, assessing by the external party the market risks associated with providing the insurance instrument, the external party receiving from the insurance provider: fixed rate, cash settlement amount, and shadow account information, and the external party determining the price of the fixed rate.

The price of the fixed rate may be determined for a time period ranging from 20 to 50 years and the price of the fixed rate may be fixed for the time period ranging from 20 to 50 years. However, the price may be determined and fixed for any time period (i.e. 10 years, 7 years, 5 years, 1 year, etc,) agreed upon by all the parties involved, without departing for the spirit of the invention. Alternatively, the fixed rate amount may be determined using a mortality table, and at least in part by the average mortality rate.

The method may include the step of ceding the risks associated with providing insurance to the individual or group by the insurance provider to a reinsurance provider and may also include the step of participating in a derivative transaction by the external party. The steps of assessing the behavior and modeling the risk may be conducted by a party separate from the insurance provider.

The external party may guaranty to the insurance provider a minimum return on investment funds.

The step of modeling the risks associated with providing insurance to the individual or group includes the step of modeling the risk associated with providing insurance to a member of a demographic, or class of underlying asset to which the individual, group or underlying asset belongs and the step of assessing the behavior of the individual or group includes the step of assessing reported history of insurance related behaviors by the individual, group or underlying asset which may increase or decrease the risk associated with issuing the insurance instrument to the individual or group.

The method further includes the step of the insurance provider assuming the risks associated with issuing the insurance instrument, investing by the individual or group in an insurance dedicated investment vehicle or insurer's general account, and investing by the insurance provider or an external party into an investment vehicle funds invested by the individual or group.

One aspect of the present invention may include mapping of the investments made by either an insured individual, an insurance provider, or a financial institution unto more hedgeable indices or investment vehicles, this is done using mathematical analysis such as regression.

The investment vehicle is selected from a group of stocks, bonds, real estate and other investment vehicles comprising the following: insurer's general account, insurance dedicated investment vehicle, money market, equities, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, and spot market. The stock indices are selected from a group comprising the following: S&P 500 TR-index, EAFE US TR index, NASDAQ-100 TR index, Lehman US Agg index, and LIBOR index.

Although multiple investment options have been listed above this list should not be considered exhaustive but merely illustrative, as the method and system described herein may be used with any investment option without departing from the spirit of the present invention.

It is another object of the invention to provide a method for distributing the market risks associated with an insurance instrument from an insurance provider to a derivative counterparty including the steps of assessing the market risks associated with providing the insurance instrument by a derivative counterparty, assuming, by the derivative counterparty, market risks associated with providing the insurance instrument, the derivative counterparty receiving from the insurance provider fixed rate, cash settlement amount, and shadow account information, and determining the price of the fixed rate by the derivative counterparty.

The price of the fixed rate may be determined for a time period ranging from 20 to 50 years and may be fixed during that time. However, the price may be determined and fixed for any time period (i.e. 10 years, 7 years, 5 years, 1 year, etc,) agreed upon by all the parties involved without departing for the spirit of the invention. Alternatively, the fixed rate amount may be determined using a mortality table, and at least in part by the average mortality rate.

The steps of assessing the behavior and modeling the risk are conducted by a party separate from the derivative counterparty, the step of the derivative counterparty guarantying to the insurance provider a minimum return on investment funds, and the insurance provider receiving from the derivative counterparty the cash settlement amount.

The step of modeling the risks associated with providing insurance to the individual or group includes the step of modeling the risk associated with providing insurance to a member of a demographic to which the individual or group belongs. The step of assessing the behavior of the individual or group includes the step of assessing reported history of insurance related behaviors by the individual or group which may increase or decrease the risk associated with issuing the insurance instrument to the individual or group.

The insurance provider assumes the risks associated with issuing the insurance instrument and the step of assessing the market risk is performed by the insurance provider or the derivative counterparty.

Investing by the individual or group in an insurance dedicated investment vehicle or insurer's general account, and investing by the insurance provider or an external party into an investment vehicle funds invested by the individual or group.

One aspect of the present invention may include mapping of the investments made by an insured individual, an insurance provider, or a financial institution unto more hedgeable indices or investment vehicles, this is done using mathematical analysis such as regression.

The investment vehicle is selected from a group of stocks, bonds, real estate and other investment vehicles comprising the following: insurer's general account, insurance dedicated investment vehicle, money market, equities, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, and spot market. The stock indices are selected from a group comprising the following: S&P 500 TR index, EAFE US TR index, NASDAQ-100 TR index, Lehman US Agg index, and LIBOR index.

Although multiple investment options have been listed above this list should not be considered exhaustive but merely illustrative, as the method and system described herein may be used with any investment option without departing from the spirit of the present invention.

Still another object of the invention is to provide a method for distributing the risks associated with an insurance instrument provided by an insurance provider to an individual or a group. The method includes the steps of assessing the behavior of the individual or group by the insurance provider, modeling the risks associated with providing insurance to the individual or group by the insurance provider, assessing the market risks associated with providing the insurance instrument by a derivative counterparty, assuming by the derivative counterparty market risks associated with providing the insurance instrument.

Furthermore, the method includes the step of the derivative counterparty receiving from the insurance provider: fixed rate, cash settlement amount, and shadow account information.

Additionally, the derivative counterparty guarantees to the insurance provider a minimum return on investment. The insurance provider receives from the derivative counterparty: the cash settlement amount. Wherein modeling the risks associated with providing insurance to the individual or group includes the step of modeling the risk associated with providing insurance to a member of a demographic to which the individual or group belongs.

Additionally, assessing the behavior of the individual or group includes assessing reported history of insurance related behaviors by the individual or group which may increase or decrease the risk associated with issuing the insurance instrument to the individual or group. Furthermore, the insurance provider may assume the risks associated with issuing the insurance instrument, and assess the market risk. The derivative counterparty may also assess and assume the market risk.

Further, investing by the individual or group in an insurance dedicated investment vehicle or insurer's general account, and investing by the insurance provider or an external party into an investment vehicle funds invested by the individual or group. One aspect of the present invention may include mapping of the investments made by either an insured individual, an insurance provider, or a financial institution unto more hedgeable indices or investment vehicles, this is done using mathematical analysis such as regression.

The investment vehicle is selected from a group of stocks, bonds, real estate and other investment vehicles comprising the following: insurer's general account, insurance dedicated investment vehicle, money market, equities, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, and spot market. The stock indices are selected from a group comprising the following: S&P 500 TR index, EAFE US TR index, NASDAQ-100 TR index, Lehman US Agg index, and LIBOR index.

Although multiple investment options have been listed above this list should not be considered exhaustive but merely illustrative, as the method and system described herein may be used with any investment option without departing from the spirit of the present invention.

It is another object of the invention to provide a method of accounting for the risk associated with providing an insurance instrument by an insurance provider as well as market risks by a derivative counterparty, for at least one reporting period, including the steps of, determining a total account value for an account associated with an insurance instrument, rolling the total account value forward, determining the amount of withdrawal dollars for the account, decrementing the amount of withdrawal dollars, determining a claim for the account, determining a lapse rate for the account, determining a mortality rate for the account, adjusting the account value for lapses, adjusting the account value for mortality, determining whether the account value should be reset and resetting the account value if a reset is determined as necessary.

The account value is at least in part determined by a sub-account value and the sub-account value is determined by an investment vehicle. The sub-account value is determined by an investment vehicle selected from a group of stocks, bonds, real estate and other investment vehicles comprising the following: insurance dedicated investment vehicle, insurer's general account, money market, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, and spot market. The stock index is selected from a group comprising the following: S&P 500 TR index, EAFE US TR index, NASDAQ-100 TR index, Lehman US Agg index, and LIBOR index.

Although multiple investment options have been listed above this list should not be considered exhaustive, as the method and system described herein may be used with any investment option without departing from the spirit of the present invention.

Alternatively, an insured individual is assumed to be invested in an insurer's general account or an insurance dedicated investment vehicle. Furthermore, the investments made by an insured individual is mapped unto more hedgeable indices or investment vehicles, this is done using mathematical analysis such as regression.

The investment vehicle is selected from a broad group consisting of: equities, bonds, real estate market, and other asset classes. The investment vehicle may further be mapped unto a more narrow group comprising the following: insurer's general account, insurance dedicated investment vehicle, money market, stock index, stock option, securities, asset backed security, derivative market, credit derivative, hybrid security, futures, forwards, swaps, corporate bond, government bond, municipal bond, bond valuation, high-yield debt, commodities market, OTC market, and spot market. The stock indices are selected from a group comprising the following: S&P 500 TR index, EAFE US TR index, NASDAQ-100 TR index, Lehman US Agg index, and LIBOR index.

Although multiple investment options have been listed above this list should not be considered exhaustive but merely illustrative, as the method and system described herein may be used with any investment option without departing from the spirit of the present invention.

A rebalance status is determined and a cash settlement amount is determined by calculating fees owed by the derivative counterparty to the insurance provider at least in part using the rebalance status and the account value.

It is another object of the invention to provide a method of accounting for the risk associated with providing an insurance instrument by an insurance provider and mitigating market risk by a derivative counterparty, wherein an account is associated with the insurance instrument and the insurance instrument causes risk of losses to the insurance provider, including the steps of rolling the total account value forward from the policy effective date to the first of the at least one reporting period for the account associated with the insurance instrument, rolling a guaranteed remaining benefits forward from a policy effective date to the first of the at least one reporting period for the account associated with the insurance instrument, adjusting of data related to insurance instrument duration for the account associated with the insurance instrument and calculating fees owed by the derivative counterparty to the insurance provider using at least in part the data related to insurance instrument duration as well as guaranteed remaining benefits.

The account value is at least in part determined by a sub-account value. The sub-account value is determined by an investment vehicle selected from a group of stocks, bonds, real estate and other investment vehicles comprising the following: insurance dedicated investment vehicle, insurer's general account, money market, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, and spot market. The stock index is selected from a group comprising the following: S&P 500 TR index, EAFE US TR index, NASDAQ-100 TR index, Lehman US Agg index, and LIBOR index. Although multiple investment options have been listed above this list should not be considered exhaustive, as the method and system described herein may be used with any investment option without departing from the spirit of the present invention.

Alternatively, an insured individual is assumed to be invested in an insurer's general account or an insurance dedicated investment vehicle, wherein the account value depends on these investment options.

Further, the investments made by an insured individual is mapped unto more hedgeable indices or investment vehicles, this is done using mathematical analysis such as regression. The investment vehicle is selected from a broad group consisting of: equities, bonds, real estate market, and other asset classes. The investment vehicle may further be mapped unto a more narrow group comprising the following: insurer's general account, insurance dedicated investment vehicle, money market, stock index, stock option, securities, asset backed security, derivative market, credit derivative, hybrid security, futures, forwards, swaps, corporate bond, government bond, municipal bond, bond valuation, high-yield debt, commodities market, OTC market, and spot market. The stock indices are selected from a group comprising the following: S&P 500 TR index, EAFE US TR index, NASDAQ-100 TR index, Lehman US Agg index, and LIBOR index.

Although multiple investment options have been listed above this list should not be considered exhaustive but merely illustrative, as the method and system described herein may be used with any investment option without departing from the spirit of the present invention.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems and methods for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
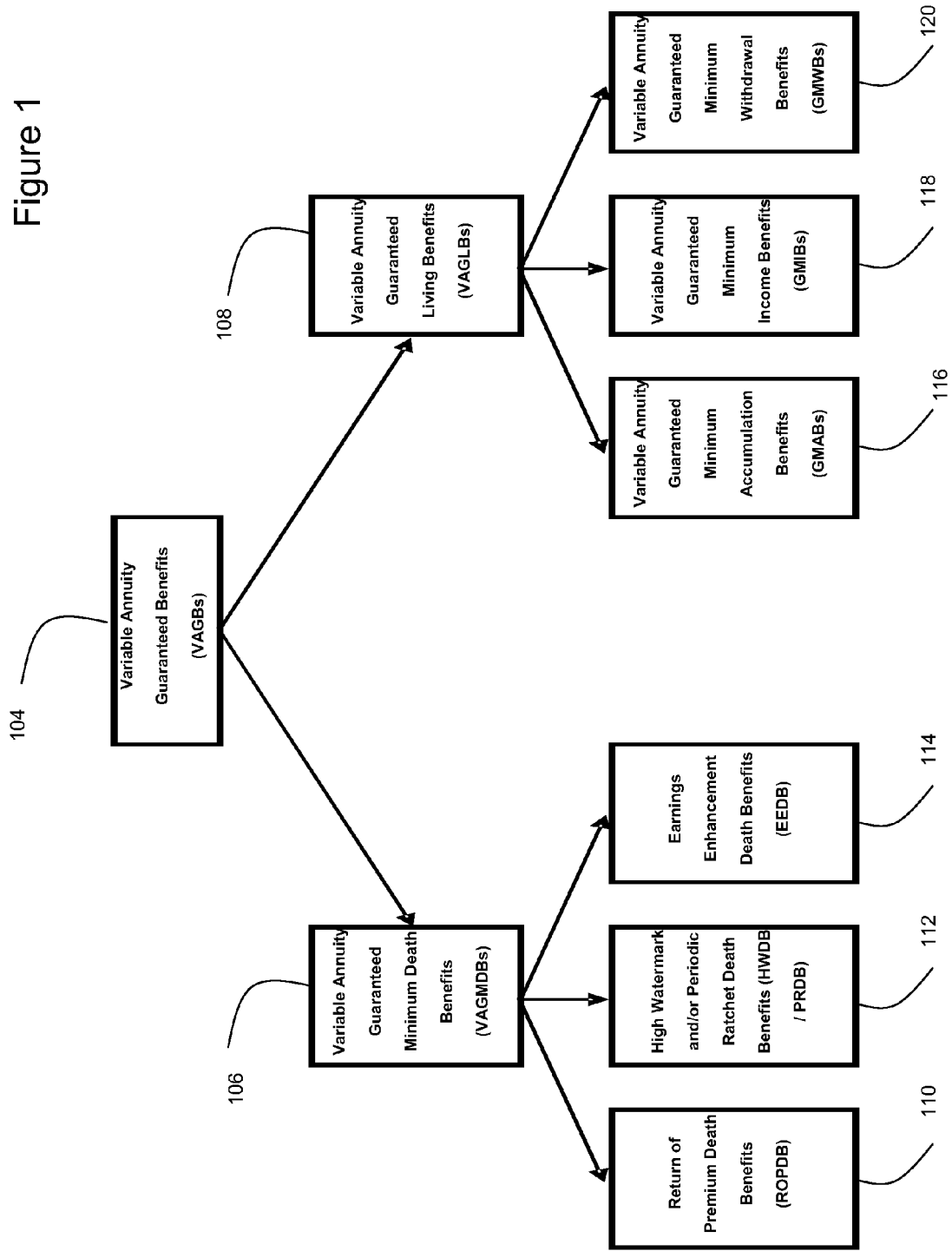
FIG. 1 is a diagram depicting several different categories of variable annuity guaranteed benefits.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Among other factors, hedging effectiveness on VA guarantees using generic hedging instruments, known as "vanilla hedging instruments," is dependent upon the size, frequency and correlation of movements in critical capital markets variables. Generally, small changes in valuation inputs will not cause a hedge to materially lose effectiveness. Depending upon the nature of the guarantee written, as well as upon the exact instruments chosen for hedging, there are two characteristics of VA guarantee liabilities that cause hedging ineffectiveness in existing systems for guaranteeing benefits using hedging: 1) the instance where valuation inputs experience large and/or sudden changes, and 2) when several of the inputs move together.

The first instance is known as a "higher-order exposure." Generally speaking, this refers to a scenario in which a single valuation input experiences a move which is much different (i.e. larger) in size than the change used to compute the asset and liability Greeks.

Effectively, what takes place in the higher-order exposure scenario is as follows:

Greeks are computed for a specified change in a particular valuation input.

Asset and liability Greeks are matched on this basis.

The actual change in the valuation input is much larger than the specified shock implemented in the Greek calculation.

The rate of change of the liability Greek with respect to the valuation input is different than the rate of change of the asset Greek with respect to the valuation input.

The result is that as the change in the valuation input takes place, the difference between $\delta_A$ and $\delta_L$ grows, leaving the net position mishedged and causing hedging inefficiency.

In mathematical terms, this can be thought of as the second, and higher-order terms in the following equation known in the art as the "Taylor expansion."

$$f(x+h) = f(x) + \frac{df}{dx}(x) \cdot h + \sum_{i=2}^{\infty} \frac{1}{i!} \cdot h^i \cdot \frac{d^i f}{dx^i}(x),$$

Consequently, the change in $f$ is as follows:

$$f(x+h) - f(x) = \frac{df}{dx}(x) \cdot h + \sum_{i=2}^{\infty} \frac{1}{i!} \cdot h^i \cdot \frac{d^i f}{dx^i}(x).$$

A first-order Greek hedge is designed to offset the largest and most prominent portion of this change, the first term, $$\frac{df}{dx}(x) \cdot h$$

on the right-hand side of the above equation. In conventional systems, it may not be desirable or possible with traditional hedging instruments, to fully hedge the incremental "higher order" exposures on the right hand side of the above equation. This turns out to be inconsequential if h is small since in that case $$\frac{1}{i!} \cdot h^i$$

will also be very small for $i \geq 2$. However, as h increases, the incremental impact of the "higher-order" hedge mismatches becomes more prominent.

Hedging programs for VA guarantees, and for guarantees on other financial instruments, can sometimes have significant higher-order exposures. A key example is the change in $\kappa_L$ as implied volatility changes ("dVegadVol"). Another key example is the change in $\delta_L$ the index price changes, sometimes known as $\Gamma_L$, ("gamma"). Yet a third example, known as the third order exposure, is the change in $\Gamma_L$ as the index price changes, sometimes also known as "speed."

The second characteristic of VA and financial product guarantee liabilities, which cause hedging ineffectiveness in existing systems for guaranteeing benefits using hedging, is related to but slightly different from the previously discussed concept of higher-order exposure, and is known in the art as "cross-gamma." Whereas a higher-order exposure describes hedging inefficiency resulting from a large move in a single valuation input, a cross-gamma is hedging inefficiency resulting from a hedging mismatch in one Greek created by the movement of the underlying input, and one or more of the other valuation inputs.

There are a very large number of possible cross-gammas. Since valuations with greater than two-factors (such as VA and financial product guarantee liabilities) have an analogous, but exacerbated, form of this issue, the concept of cross-gamma is illustrated herein with respect to a simplified, two-factor example. For two-dimensional functions, the Taylor series is defined as follows:

$$f(x+h, y+k) = f(x, y) + \frac{df}{dx}(x, y) \cdot h + \frac{df}{dy}(x, y) \cdot k +$$

-continued
$$\frac{1}{2} \cdot h^2 \cdot \frac{d^2 f}{dx^2}(x, y) + \frac{1}{2} \cdot k^2 \cdot \frac{d^2 f}{dy^2}(x, y) + h \cdot k \frac{d^2 f}{dydx}(x, y) + O(3+)$$

where $O(3+)$ denotes all terms of order 3 and higher. In this case, it is apparent through the cross terms that the change in $f$ is:

$$f(x+h, y+k) - f(x, y) = \frac{df}{dx}(x, y) \cdot h + \frac{df}{dy}(x, y) \cdot k +$$

$$\frac{1}{2} \cdot h^2 \cdot \frac{d^2 f}{dx^2}(x, y) + \frac{1}{2} \cdot k^2 \cdot \frac{d^2 f}{dy^2}(x, y) + h \cdot k \frac{d^2 f}{dydx}(x, y) + O(3+)$$

and can be decomposed as:
the first order exposures, $$\frac{df}{dx}(x, y) \cdot h + \frac{df}{dy}(x, y) \cdot k,$$

described above and for which hedging may be more straightforward,
the second-order exposures, $$\frac{1}{2} \cdot h^2 \cdot \frac{d^2 f}{dx^2}(x, y) + \frac{1}{2!} \cdot k^2 \cdot \frac{d^2 f}{dy^2}(x, y),$$

described above, for which hedging is more difficult but sometimes possible, and
the cross-gamma exposure represented by $$h \cdot k \frac{d^2 f}{dydx}(x, y),$$

which is not present in the single-variable case.

An important concept, as seen above, is that the change in the function $f$ has a term dependent upon the partial derivative with respect to both variables. So even if hedging the first and higher-order exposures of the two inputs, namely x and y, ineffectiveness is still realized if the two variables moved at the same time.

This arises frequently in existing systems, in which interdependencies among valuation inputs are common and sometimes quite strong. A few key examples would be the dependency of $\kappa_L$ on changes in stocks and/or interest rates, sometimes referred to as "dVegadSpot" and "dVegadRates." These cross-gamma exposures can be severe in the case of VA or another financial product guarantee liabilities and create hedging ineffectiveness when movements in these capital markets inputs occur simultaneously. Generally speaking, the hedging performance decreases as the size of the changes in the input variables increase.

Thus, for the above-described reasons, existing systems for guaranteeing benefits or underlying assets using hedging are often incomplete and plagued with a lack of certainty that the assets generated from hedging would cover the liability stemming from VAGBs.

Because current hedging programs are incomplete and uncertain, there is a clear need in the art for a system and method to more effectively redistribute the risk associated with variable annuities and other financial products. The present invention overcomes the various deficiencies associated with traditional survival hedging programs.

The present invention comprises a method and system for distributing the risks associated with an insurance instrument (e.g. insurance policy) or a multitude of other non-insurance financial products provided by an insurance provider or a financial institution to an individual or group. The present invention entails the steps of assessing the behavior of the insured individual by the insurance provider, modeling the risks associated with providing insurance to the individual or group by the insurance provider, assessing the market risks associated with providing the insurance policy, by a derivative counterparty and assuming, by the derivative counterparty, market risks associated with providing the insurance instrument.

Wherein the market risks may comprise one or more of the following: risks associated with changes in policy account values and guaranteed minimum withdrawal benefits rights due to changes in the performance of the underlying stock and bond mutual funds in which policyholder funds are invested. Additionally, the behavior risks may comprise one or more of the following: mortality, withdrawal rates, lapse rates, exercise and non-exercise of "step-up" rights afforded policyholders. The above lists are merely exemplary of the types of market risks and behavior risks and is not meant to be exhaustive, other types of market risks and behavior risks may be applicable and will become apparent upon the implementation of the present invention.

The present invention is described herein in terms of insurance instruments and variable annuities. However, skilled artisans will recognize the systems and methods disclosed are applicable to virtually any other non-insurance financial product. Therefore, references to insurance or annuities are also meant to include any non-insurance financial products having risk associated therewith. Additionally, while an insurance provider may make insurance instruments available, the insurance company, or any other financial institution, may provide non-insurance financial products covered by the described invention, and may apply the principles of the present invention to mitigate risk associated with any offered non-insurance financial products. Thus, any references to an insurance provider or financial institution are intended to encompass all providers of insurance or non-insurance financial products.

For example, a financial institution may wish to hedge against risk associated with mortgage backed securities in much the same way that an insurance company may wish to hedge against losses that may occur for a variable annuity. In both cases, behavior risks and market risks exist. However, a variable annuity may have behavior risks associated with the behavior of the individual holding a variable annuity, while the behavior risk for a mortgage backed securities may include the statistical behavior of a group of mortgage holders holding mortgages covered by the mortgage backed security.

Similarly market risks may exist for non-insurance financial products in the same way that market risks exists for variable annuities. Financial institutions and insurance companies may advantageously apply the principles of the present invention to any kind of insurance or non-insurance financial product, regardless of the source of the risk, in order to mitigate similar classes of risk.

The market risks may comprise one or more of the following: risks associated with changes in policy account values and guaranteed minimum withdrawal benefits rights due to changes in the performance of the underlying stock and bond mutual funds in which policyholder funds are invested. Additionally, the behavior risks may comprise one or more of the following: mortality, withdrawal rates, lapse rates, exercise and non-exercise of "step-up" rights afforded policyholders. The above lists are merely exemplary of the types of market risks and behavior risks and is not meant to be exhaustive, other types of market risks and behavior risks may be applicable and will become apparent upon the implementation of the present invention.

Figure 2:
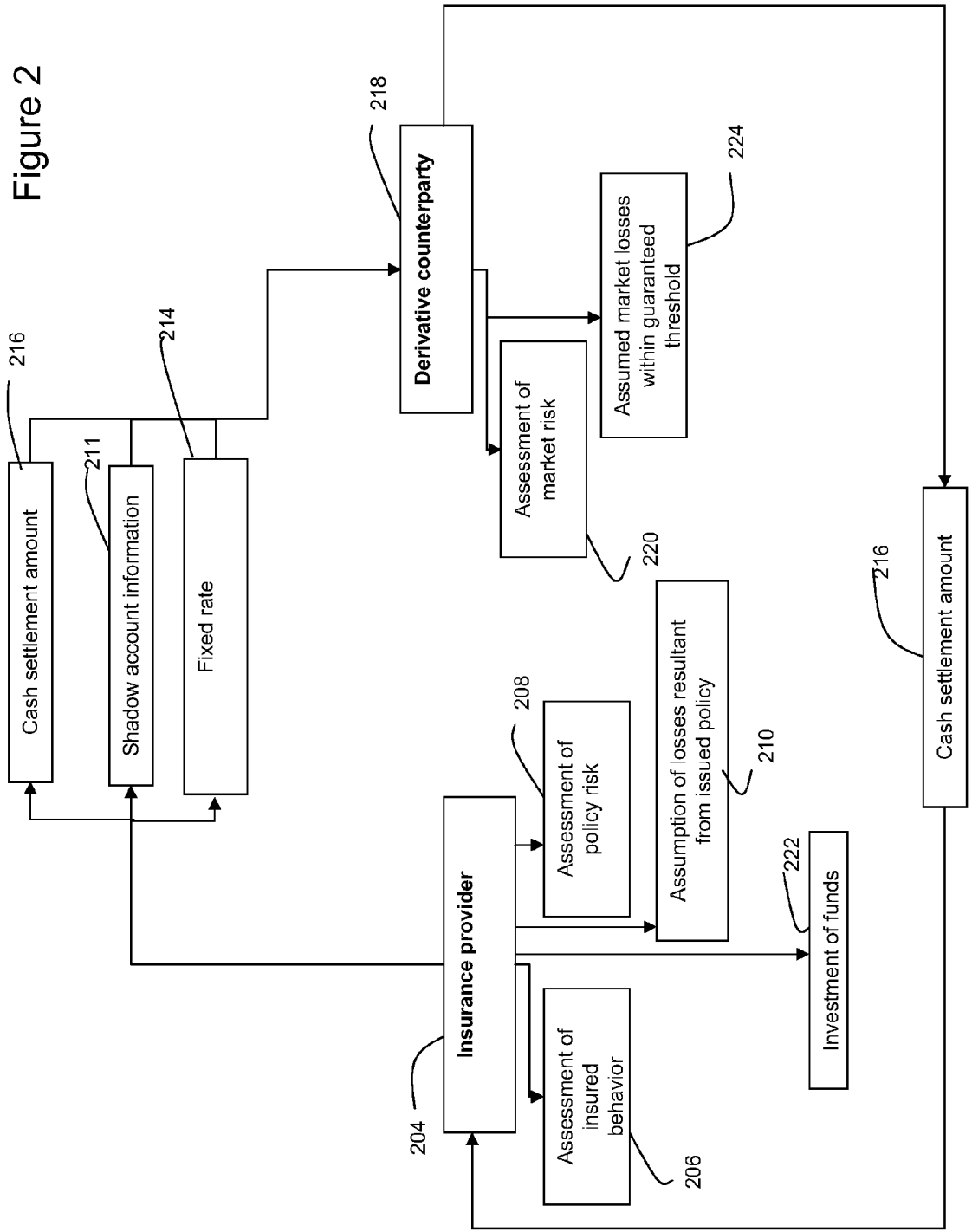
FIG. 2 is a diagram depicting the management structure of risk elements and funds in accordance with an embodiment of the present invention.

FIG. 2 depicts the management structure of risk elements and funds, in the implementation of the present invention, as well as the relationship of such aspects of the present invention to both the insurance provider and the derivative counterparty.

The insurance provider 204 manages any risks associated with issuing an insurance policy. Specifically, the insurance provider 204 is responsible for assessment of policy risks 208, investment of funds 222, assessment of behavior of insured individuals 206 and non-insurance financial products, and assumption of losses resultant from any issued policy 210. Furthermore, the insurance provider 204 passes on to the derivative counterparty 218 any shadow account information 211, fixed rate 214, and cash settlement amount 216. Additionally, the fixed rate amount may be determined using a mortality table, or at least in part by the average mortality rate. The assessment of behavior refers to studying the history of filed claims by the insured individual, group, financial product, underlying asset or asset class, and the assessment of risk refers to a statistical risk associated with providing insurance to a member of a specific demographic or providing a non-insurance financial product in a class or demographic.

In turn, the derivative counterparty 218 manages any risks associated with the investment of funds. Specifically, the derivative counterparty 218 is responsible for assessment of market risks 220, and assumption of market losses within a guaranteed threshold 224. Furthermore, the derivative counterparty 218 passes on to the insurance provider 204 cash settlement amount 216.

Figure 3:
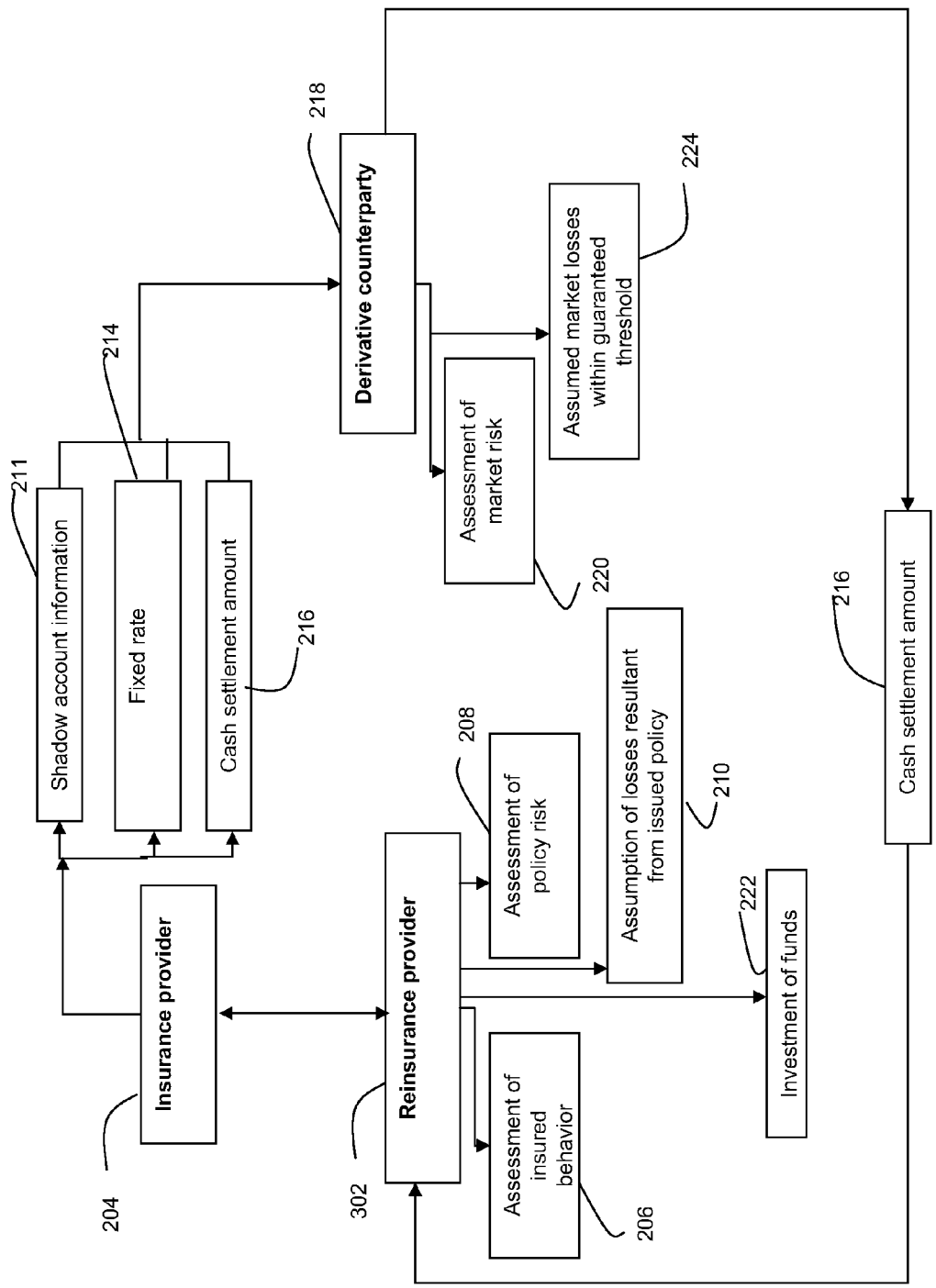
FIG. 3 is a diagram depicting an alternative management structure of risk elements and funds in accordance with an embodiment of the present invention.

Alternatively, as depicted in FIG. 3, the insurance provider 204 transfers or cedes the risk that would be retained by the insurance provider 204 to a reinsurance provider 302. The reinsurance provider 302 is responsible for assessment of policy risks 208, investment of funds 222, assessment of behavior of insured individuals 206, and assumption of losses resultant from any issued policy 210. Furthermore, the insurance provider 204 may elect to maintain management of any aspects managed by the reinsurance provider 302. Additionally, the assessment of policy risks 208 and assessment of behavior of insured individuals 206, financial product or underlying asset, may be done by a party separate from the insurance provider 204, reinsurance provider 302 and derivative counterparty.

Furthermore, the insurance provider 204 passes on to the derivative counterparty 218 any shadow account information 211, fixed rate 214, and cash settlement amount 216.

In turn, the derivative counterparty 218 manages any market risks or risks associated with the investment of funds. Specifically, the derivative counterparty 218 is responsible for assessment of market risks 220, and assumption of market losses within a guaranteed threshold 224. Furthermore, the derivative counterparty 218 passes on to the insurance provider 204, cash settlement amount 216.

Additionally, the derivative counterparty 218 may enter into an agreement with the insurance provider 204 wherein the derivative counterparty 218 determines the price for a period of 20 to 50 years for the services provided to the insurance provider 204 cash settlement amount 216. Furthermore, the derivative counterparty 218 may elect to set the aforementioned price to a fixed amount for any period of time (i.e. 20 to 50 years).

Alternatively, the fixed amount may be determined using a mortality table, or at least in part by the average mortality rate or a formula that utilizes the mortality rate. However, the price may be determined and fixed for any time period (i.e. 10 years, 7 years, 5 years, 1 year, etc,) agreed upon by all the parties involved without departing from the spirit of the invention.

However, it should be noted, that even though market risk is a separate type of risk from behavior risk, some residual risk related to market risks is maintained in the behavior risks and some residual risk related to behavior risks is maintained in the market risks, in the divided risks associated with providing an insurance instrument to an individual or group.

Importantly, the present invention may comprise a group of insurance instrument or non-insurance financial products. In such an instance, the group of insurance instruments may be grouped based at least in part on demographic characteristics, investment style, product chassis and rider design.

Figure 4:
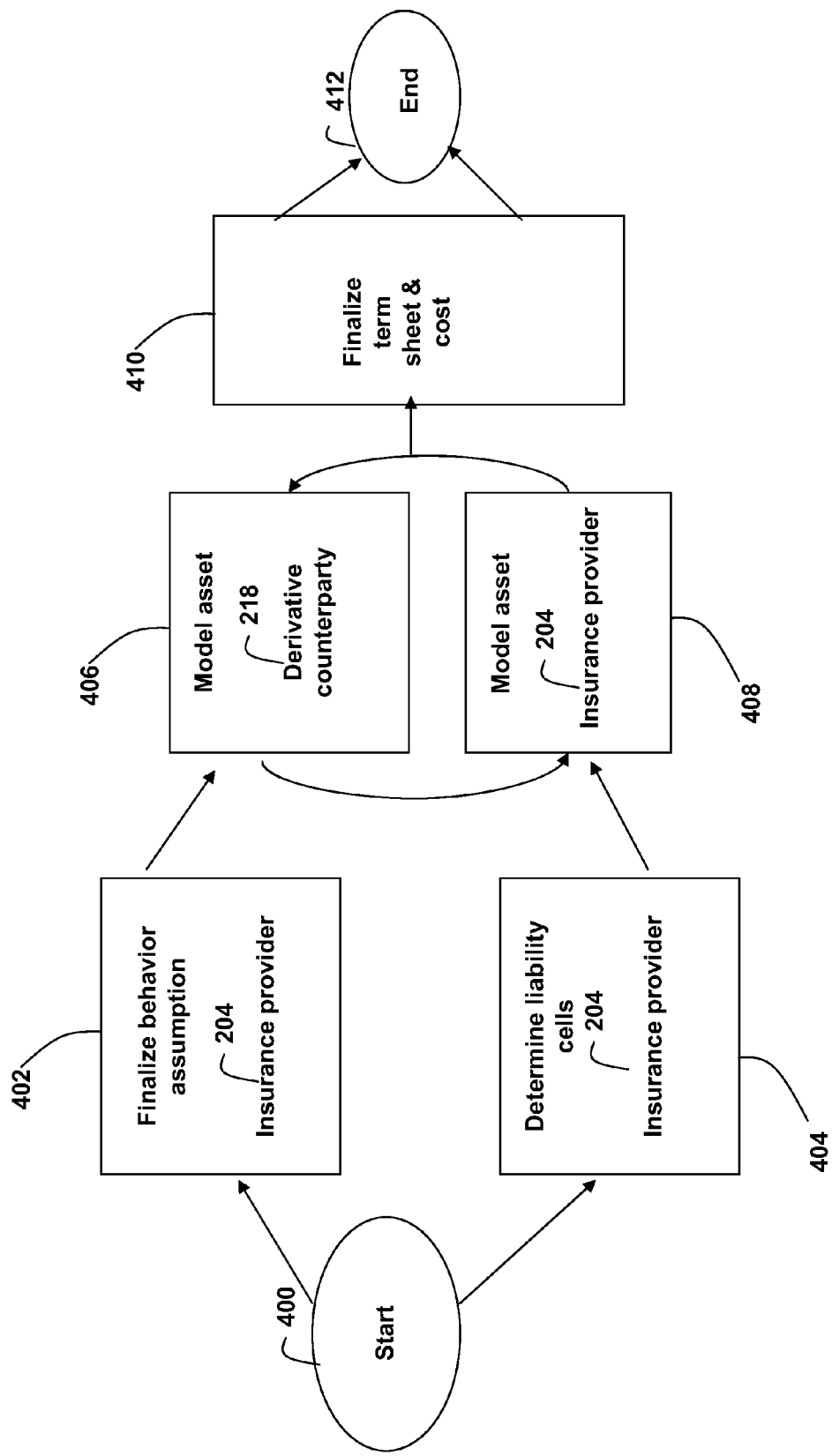
FIG. 4 is a flow chart depicting the procedures which take place prior to initiating the transaction between the insurance provider and the derivative counterparty in accordance with an embodiment of the present invention.

FIG. 4 depicts the procedures which take place prior to initiating the transaction between the insurance provider and the derivative counterparty. First, the procedure starts in step 400, the insurance provider 204 finalizes behavior assumptions for the behavior of the policy holder in step 402. At the same time, the insurance provider 204 also determines the liability cells in step 404. A cell is an individual unit of data representing specific calculation parameters used in assessing financial liability. Subsequently, the derivative counterparty models the assets in step 406, at the same time the insurance provider 204 also models the assets in step 408. The asset modeling information is exchanged between the derivative counterparty and the insurance provider 204. Finally, the term sheet and cost are finalized in step 410 and the procedure ends in step 412.

Figure 5:
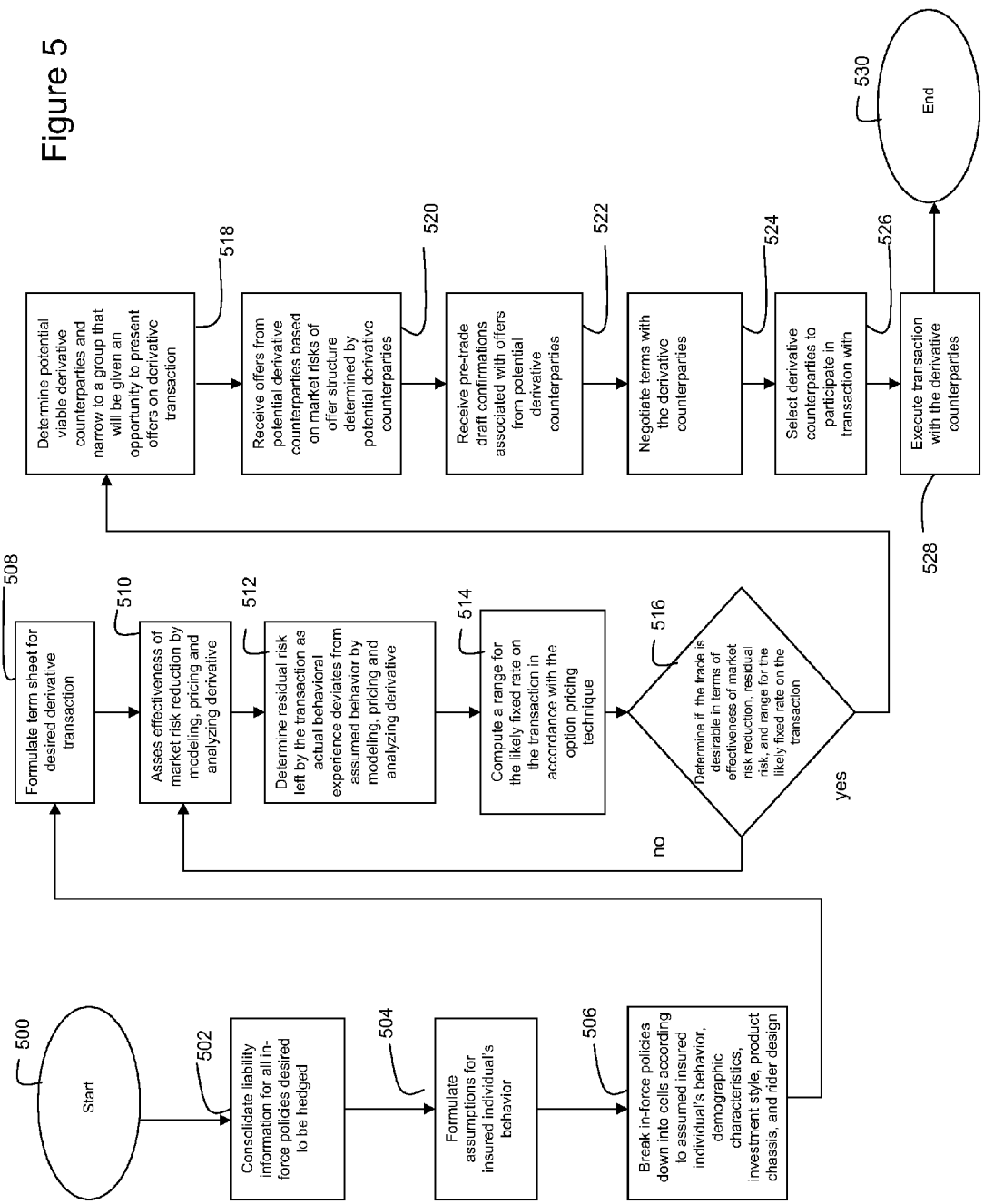
FIG. 5 is a detailed flow chart depicting the steps taken by the insurance provider prior to initiating the transaction between the insurance provider and the derivative counterparty in accordance with an embodiment of the present invention.

FIG. 5 depicts the steps taken by the insurance provider prior to the transaction between the insurance provider and the derivative counterparty. First, the procedure starts in step 500 the insurance provider consolidates liability information for all in force policies desired to be hedged in step 502. The insurance provider then formulates assumptions for the insured individual or underlying asset's behavior in step 504. Subsequently, the insurance provider breaks in force policies down into cells according to assumed insured individual, financial product or underlying asset's behavior, demographic or class characteristics, investment style, product chassis, and rider design in step 506. The insurance provider then formulates the term sheet for the desired derivative transaction in step 508.

The insurance provider assesses the effectiveness of market risk reduction by modeling, pricing and analyzing the derivative in step 510. Afterwards, the insurance provider determines residual risk left by the transaction as actual behavioral experience deviates from assumed behavior by modeling, pricing and analyzing the derivative in step 512. A range is then computed for the likely fixed rate on the transaction, in accordance with the option pricing technique (e.g. based on the average mortality rate, financial factors, etc) by the insurance provider in step 514. Further, the insurance provider determines if the trade is desirable in terms of effectiveness of market risk reduction, residual risk, and range for the likely fixed rate on the transaction in step 516.

If the trade is determined to have undesirable terms the insurance provider iterates this procedure by repeating steps 510 through 516 until the terms of the trade are determined to be desirable in step 516. If the trade is determined to be desirable in step 516 the insurance provider then determines the potential viable derivative counterparties and narrows the potential counterparties considered to a group that will be given the opportunity to present offers on the derivative transaction in step 518. The insurance provider receives offers from potential derivative counterparties based on market risks of the offer structure determined by the potential derivative counterparties in step 520.

Subsequently, the insurance provider receives pre-trade draft confirmations associated with offers from the potential derivative counterparties in step 522. The insurance provider then negotiates the terms of the transaction with the derivative counterparties in step 524. Afterwards, the insurance provider selects the derivative counterparties for participation in the derivative transaction in step 526. Finally, the insurance provider executes the transaction in step 528, the procedure is then ended in step 530. Although the above described procedures are conducted by the insurance provider, the insurance provider may cede the risk associated with issuing the insurance instrument to a reinsurance provider. In such an instance the reinsurance provider may conduct any or all of the above procedures without departing from the spirit of the present invention.

Figure 6:
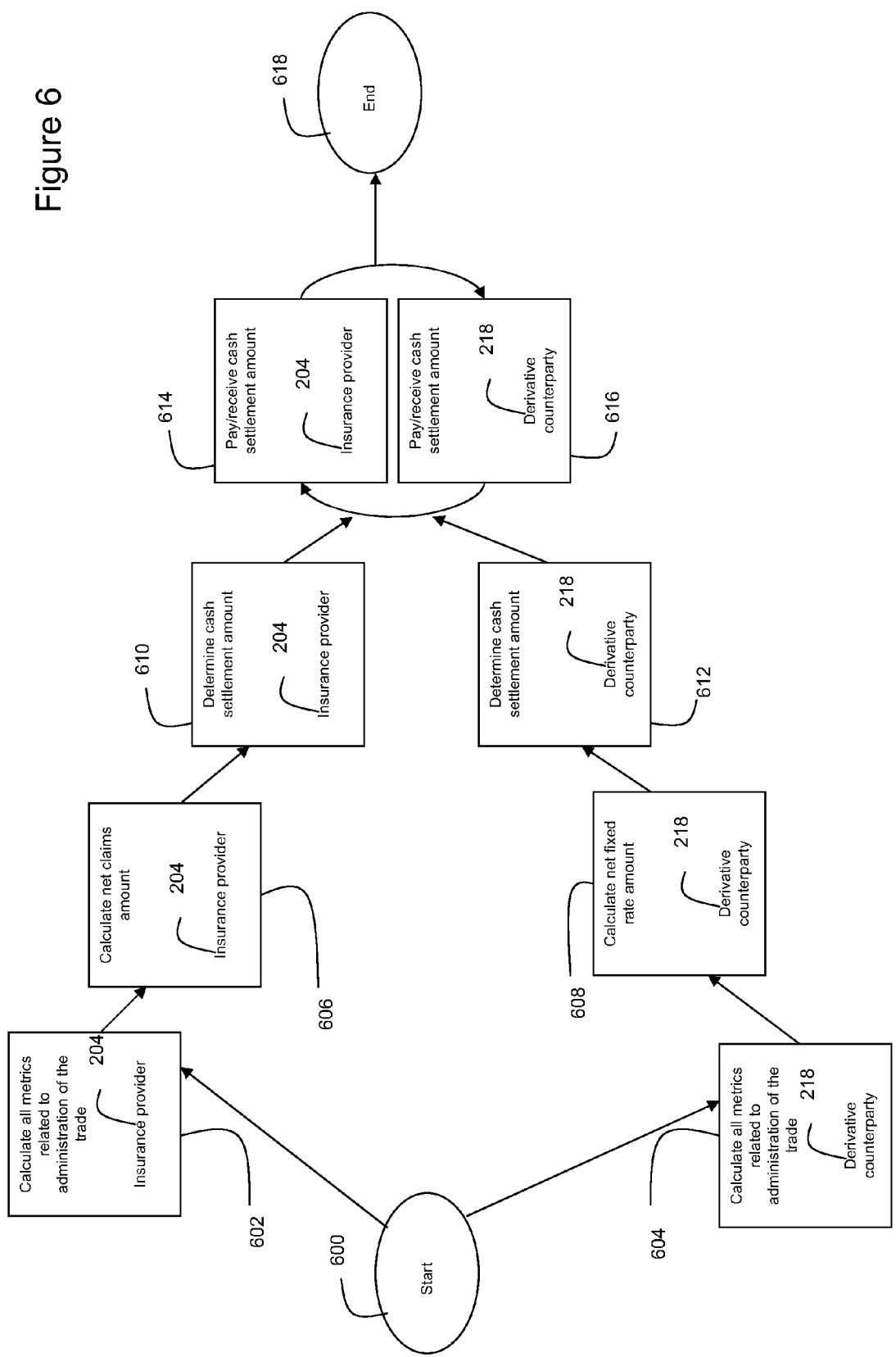
FIG. 6 is a flow chart depicting procedures which take place upon completion of the transaction, in order to facilitate a payment exchange between the insurance provider and the derivative counterparty in accordance with an embodiment of the present invention.

FIG. 6 depicts procedures which take place upon completion of the transaction between the insurance provider and the derivative counterparty. Specifically, the procedures which lead to the payment exchange between the insurance provider and the derivative counterparty.

The procedure starts in step 600, initially, the insurance provider 204 calculates all of the metrics related to administration of the trade in step 602, at the same time the derivative counterparty 218 calculates all metrics related to the administration of the trade in step 604. Subsequently, the insurance provider 204 calculates the net claims amount in step 606, while the derivative counterparty 218 calculates the net fixed rate amount in step 608.

The insurance provider 204 then determines the cash settlement amount in step 610, while the derivative counterparty 218 does the same in step 612. Finally, the insurance provider 204 pays or receives the cash settlement amount in step 614 to/from the derivative counterparty 218 depending on whether the cash settlement amount was determined to be negative or positive in the insurance provider's 218 favor, concurrently the derivative counterparty 218 does the same in step 616. Upon the completion of the payment exchange between the insurance provider 204 and the derivative counterparty 218 the procedure terminates in step 618.

Figure 7:
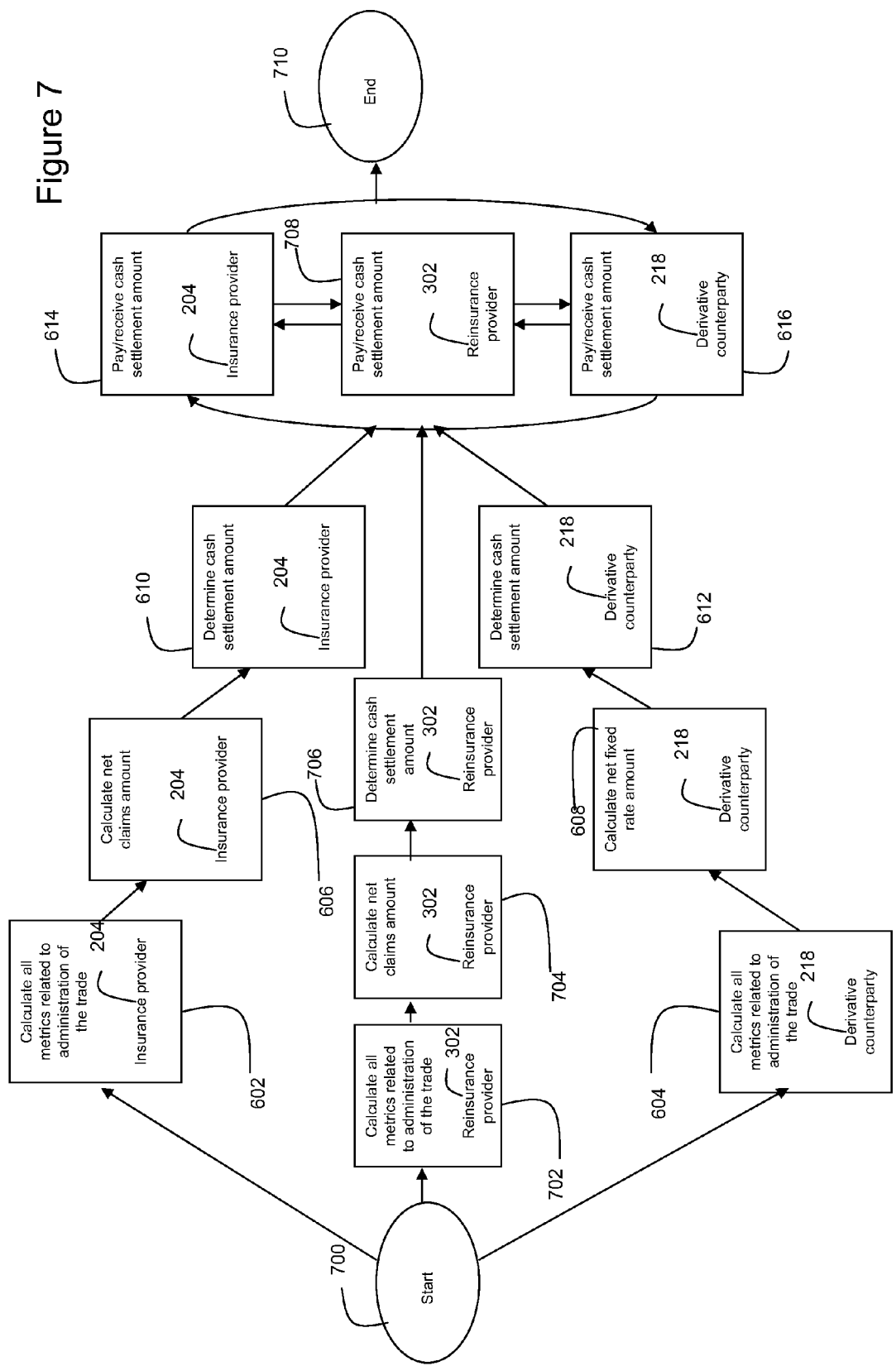
FIG. 7 is a flow chart depicting procedures which take place upon completion of the transaction, in order to facilitate a payment exchange between the reinsurance provider, the insurance provider and the derivative counterparty in accordance with an embodiment of the present invention.

FIG. 7 depicts the procedures which take place upon completion of the transaction, in order to facilitate a payment exchange between the reinsurance provider, the insurance provider and the derivative counterparty.

The procedure starts in step 700, initially the insurance provider 204 calculates all of the metrics related to administration of the trade in step 602, while the reinsurance provider 302 does the same in step 702. At the same time the derivative counterparty 218 calculates all metrics related to the administration of the trade in step 604. Subsequently, the insurance provider 204 calculates the net claims amount in step 606, the reinsurance provider 302 does the same in step 704. Simultaneously, the derivative counterparty 218 calculates the net fixed rate amount in step 608.

The insurance provider 204 then determines the cash settlement amount in step 610, the reinsurance provider 302 does the same in step 706. At the same time, the derivative counterparty 218 also determines the cash settlement amount in step 612. Finally, the insurance provider 204 pays or receives the cash settlement amount in step 614 to/from the reinsurance provider 302 or the derivative counterparty 218, depending on whether the cash settlement amount was determined to be negative or positive in the insurance provider's 218 favor, the reinsurance provider 302 also pays or receives the cash settlement amount in step 708 in accordance with conditions agreed upon by the insurance provider 204, the reinsurance provider 302, and the derivative counterparty 218.

Concurrently, the derivative counterparty 218 also pays or receives the cash settlement amount in step 616 to/from the reinsurance provider 302 or the insurance provider 204, depending on whether the cash settlement amount was determined to be negative or positive in the insurance provider's 218 favor. Upon the completion of the payment exchange between the insurance provider 204, the reinsurance provider 302 and the derivative counterparty 218 the procedure terminates in step 710.

Figure 8:
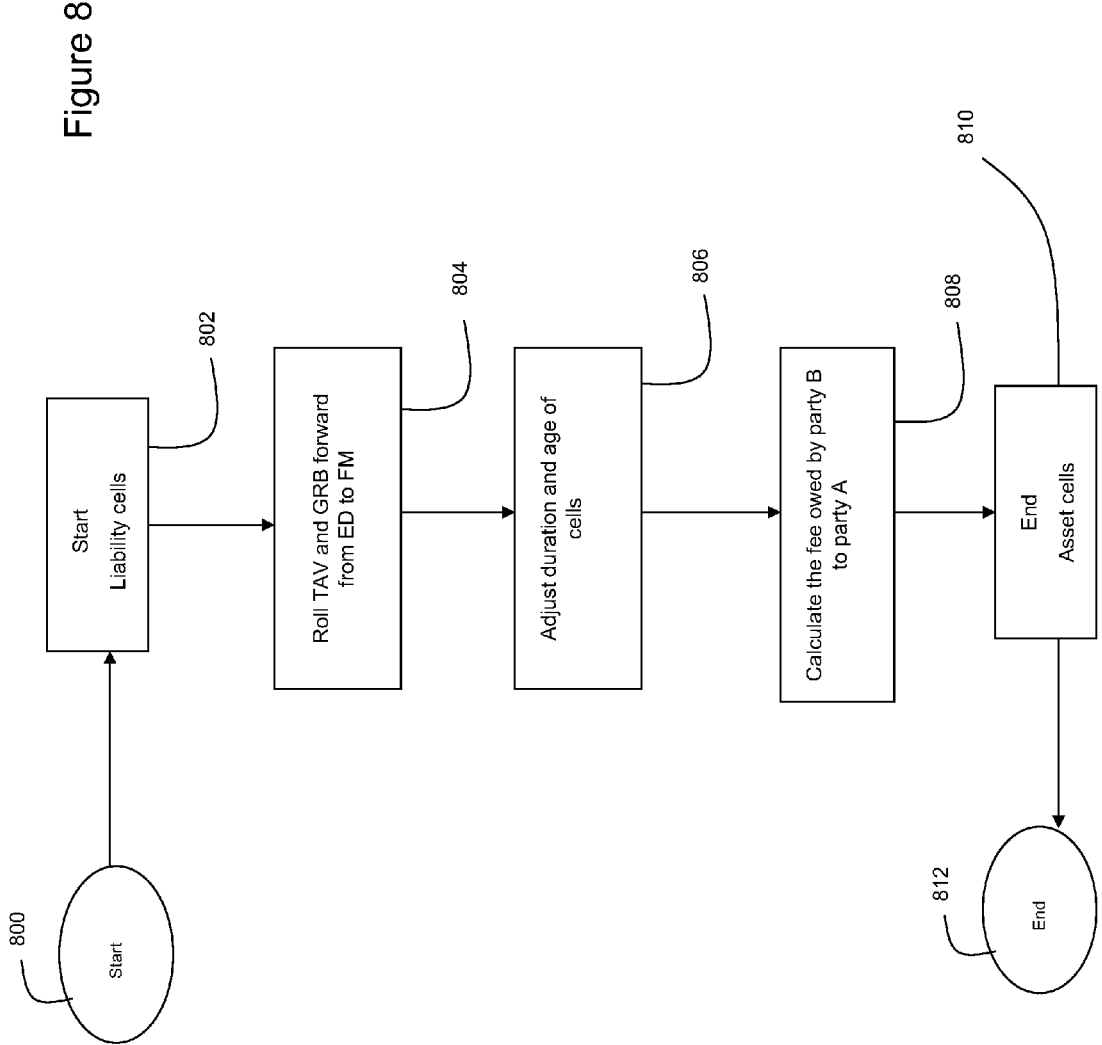
FIG. 8 is a flow chart depicting the calculations performed on the first reporting date in accordance with an embodiment of the present invention.

FIG. 8 depicts the calculations performed by the insurance provider on the first reporting date. These calculations are generally performed in order to account for the risks associated with issuing an insurance policy. A one-time roll forward from the cell effective date ("ED") to the first reporting date ("FM"), will be described. The procedure starts in step 800, before the procedures depicted in FIG. 8 take place, the cells operated on are liability cells 802, namely cells containing data related to any liability resultant from issuing an insurance policy. In step 804, the total account value ("TAV") and the guaranteed remaining benefit ("GRB") are rolled forward from ED to FM (which may be less or more than one month). The TAV is the amount of money in a cell at a given point in time, and is the sum of the money in the five sub-accounts of the cell, or the value of the assets or financial products guaranteed', while the GRB is the amount guaranteed to be returned with respect to a given cell. The TAV and GRB are rolled forward from ED to FM on the first reporting date, this step is generally performed in order to account for market performance and cell behavior.

In order to roll forward the TAV, GRB and premium base ("PB") for market performance, and estimate behavior in a simplified manner for the period from ED to FM several methods may be used. Wherein the premium base is the amount multiplied by $1/12^{th}$ of the withdrawal rate ("WDR") in order to produce the amount of withdrawal dollars ("WDD"). For example:

$$n = FM - ED$$

Where n is expressed in the number of days. For example, if ED is May 21, 2007, and the trade date is May 29, 2007, then n=May 31, 2007-May 21, 2007=10 days.

Using this data, the amount guaranteed to be returned on the first responding date with respect to a cell, namely the GRBFM, maybe calculated as follows:

$$GRBFM = GRBED \times (0.96)^{(N/365.25)}$$

Thus, using the above results, the sub-account value calculated on the first reporting date ("SAViFM") will be calculated using the following method:

$$SAViFM = SAViED \times (1-D-R)^{(n/365.25)} \times (0.90)^{(n/365.25)} \times (V_i^{FM}/V_i^{ED})$$

Where $V_i^{FM}$ is the total return index value for index i, as of the first valuation date, to occur after ED, and $V_i^{ED}$ is the total return index value for index i as of ED.

Finally, the total account value calculated on the first reporting date ("TAVFM") and the PB calculated on the first reporting date ("PBFM") values may be calculated in the following manner:

$$TAVFM = \sum_{I=1}^{5} SAViFM.$$

and $$PBFM = PMED \times 0.98^{n/365.25}$$

The sub-account value ("SAV") for a given adjustment period I is denoted as SAVi. This notation method of the appropriate reporting date is likewise applied to all other relevant variables. The SAV may be related to the performance of a number of investment vehicles chosen from a group of stocks, bonds, real estate and other investment vehicles such as: insurance dedicated investment vehicle, insurer's general account, money market, stock index, stock option, securities, asset backed security, derivative market, credit derivative, hybrid security, futures, forwards, swaps, corporate bond, government bond, municipal bond, bond valuation, high-yield debt, commodities market, OTC market, real estate market, or spot market.

Although multiple investment options have been listed above this list should not be considered exhaustive, as the method and system described herein may be used with any investment option without departing from the spirit of the present invention.

Upon the completion of step 804, the adjustment of duration and age of the cells is performed in step 806. Both duration and age are expressed in years in the cell listing. In step 806, duration is first advanced to FM from ED, then converted to months and finally rounded. Age is advanced to FM from ED, but not rounded. Duration is increased one month for each reporting date after the first reporting date, and age is increased $1/12$th of a year each reporting date after the first reporting date.

The duration calculated on the first reporting date, measured in months ("DFM") and age calculated on the first reporting date, measured in years ("AFM"), may be calculated using several methods. For example, one method uses the following formulas:

$$DFM = \text{Round}[DED + n/365.25) \times 12, 0]$$

and $$AFM = AED + n/365.25$$

In step 808, the fees owed to party A for the first reporting date are calculated. Wherein party A is the insurance provider and party B is the derivative counterparty. The fees owed may be calculated according to the following formula:

$$H = TAVFM \times F \times Q \times n/365.25$$

Where H represents the cash settlement amount on the cash settlement payment date, to be paid from party B to party A, immediately following the first reporting date. Upon completion of step 808, the liability cells 802 are converted to asset cells 810, namely cells containing data related to assets resultant from investment of fund generated by the insurance provider, the procedure then ends in step 812.

Figure 9:
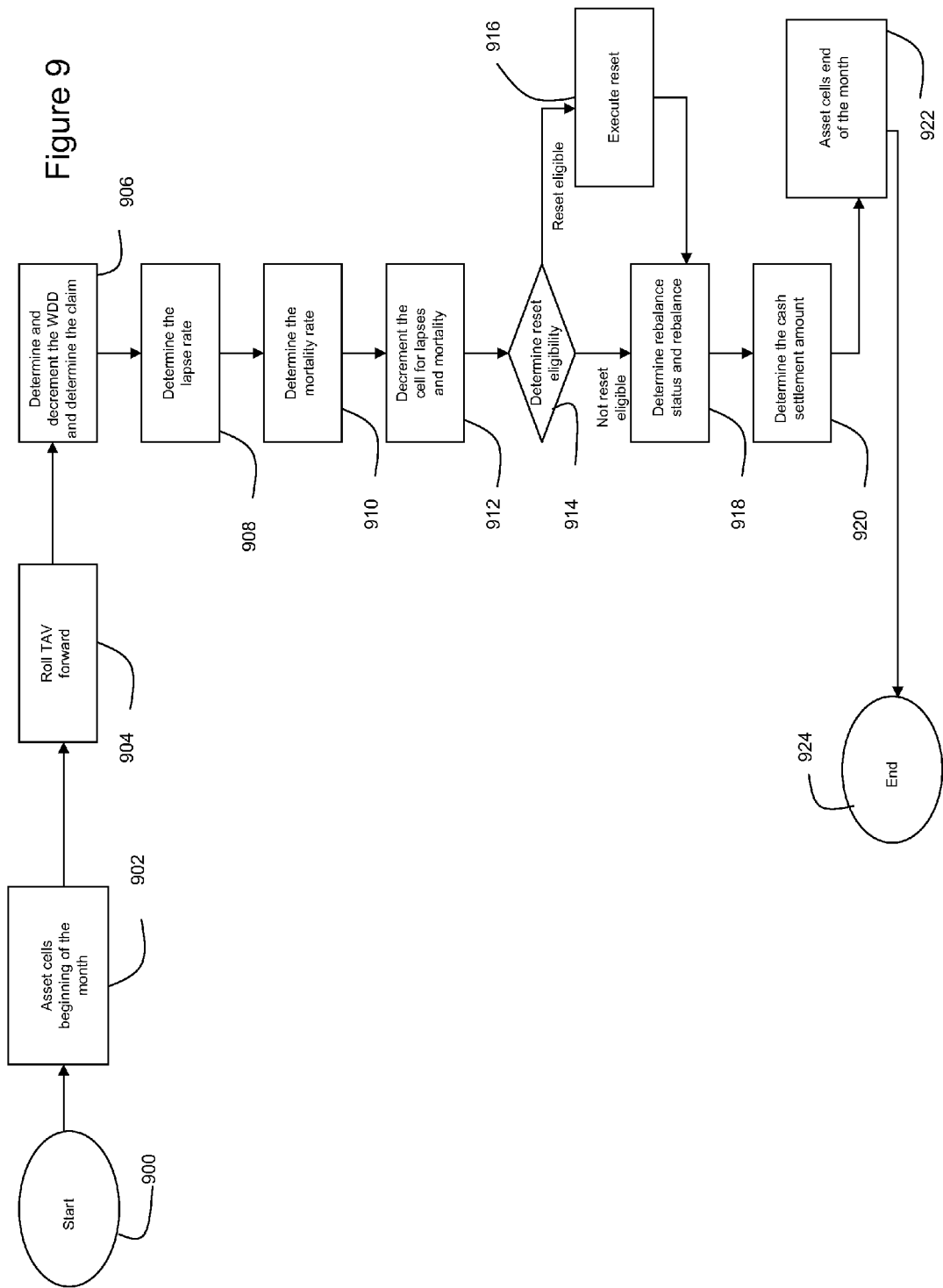
FIG. 9 is a flow chart depicting the calculations performed for each reporting date following the first reporting date for each cell in accordance with an embodiment of the present invention.

For each cell as described above, specific calculations will be performed for each reporting date after the first reporting date, as seen in FIG. 9. These calculations, like those depicted in FIG. 8, are conducted in order to asses the risks and liability caused by issuing an insurance policy.

The procedure starts in step 900, initially the cells operated on are beginning of the month asset cells 902. In step 904, the TAV is rolled forward. When the TAV is rolled forward several values are calculated.

Wherein the sub-account SAVi maybe one of several types of sub-account values. Some possible sub account values for a given cell are: a sub-account value associated with the S&P 500 TR index ("SAV1"), a sub-account value associated with the EAFE US TR index ("SAV2"), a sub-account value associated with the NASDAQ-100 TR index ("SAV3"), a sub-account value associated with the Lehman US Agg index ("SAV4"), and a sub-account value associated with the LIBOR index ("SAV5"). Additionally, a sub account value may be associated with the value or rating of an asset or financial product to be guaranteed.

Thus, if the reporting date is the second reporting date then the SAVi1 value is determined using the following equation:

$$SAVi1=(SAViFM)*(1+TRi\text{-}d\text{-}r)$$

For all other reporting dates the SAVi1 value is computed using the following formula:

$$SAVi1=(SAVi7\text{-}1)*(1+TRi\text{-}d\text{-}r)$$

Where d and TAV1 values are computed as follows:

$$d=1-(1-d)^{(1/12)} \text{ and } r=1-(1-R)^{(1/12)}$$

and

TAV1=Sum of five SAVi1's

Where TRi is defined as: TRi=(total return index value for index i as of the valuation date immediately preceding the reporting date)/(total return index value for index i as of the valuation date immediately preceding the prior reporting date)−1.

Furthermore, for the second reporting date the GREB1 and PB1 values are computed by evaluating the equations below, respectively:

$$GRB1=GRBFM$$

and $$PB1=PBFM$$

For all other reporting dates, the GREB1 and PB1 values are computed using the methods outlined below, respectively:

$$GRB1=GRB7\text{-}1$$

and $$PB1=PB7\text{-}1$$

Upon the completion of step 904, the WDD is determined and decremented, as well as the claim (if any) is determined in step 906. In step 908 the lapse rate is determined as described in detail below. Once the FLR is computed, the mortality rate is determined in step 910.

After the BMR is computed, in step 912, the cell is decremented for lapses and mortality. In step 912 the values for TAV5, GRB5, PB5 and SAVi5 are computed as outlined below, respectively:

$$TAV5=TAV2*(1\text{-}FLR)*(1\text{-}BMR)$$

$$GRB5=GRB2*(1\text{-}FLR)*(1\text{-}BMR)$$

$$PB5=PB2*(1\text{-}FLR)*(1\text{-}BMR)$$

SAVi5=SAVi2*(TAV5/TAV2) unless TAV2=0, In which case SAVi5=0

After the cell is decremented in step 912, for each cell it is determined whether the cell is eligible to be reset. In step 914, a reset status is determined, namely is a cell eligible for a reset. Each cell has a reset type of 1 to 6, which identifies a moneyness threshold at which, if eligible, a reset procedure is executed in step 916, as seen in the table below.

| Reset Type | Moneyness Threshold |
|---|---|
| 1 | 15.0% |
| 2 | 24.4% |
| 3 | 38.9% |
| 4 | 60.7% |
| 5 | 75.0% |
| 6 | Never |

A cell is eligible for a reset if it has a duration greater than or equal to sixty (60) months, and has not yet reset. Additionally, the cell is eligible for a reset if it has previously reset, and the duration as of the reporting date the cell's last reset was sixty (60) or more months less than the current duration. If a cell is not reset eligible, it will not reset.

If a cell is determined to be eligible for a reset in step 914, and GRB5 is greater than zero (0), a reset subroutine is executed in step 916. If a reset is not applied after step 914, then the GRB6 value is equal to the GRB5 value, and PB6 is equal to the PB5 values. Furthermore, the above formulas result in there being two ways a reset can increase withdrawals for the cell. Namely, the PB6 increases and/or the withdrawals are taken for a longer period of time. If the GRB5 has hit zero, the cell can still reset.

If a reset has occurred after step 914, in step 1306, a rider charge is adjusted. If a reset occurs then the rider charge ("R") for that cell becomes 50 bps, or 0.5%, which it may or may not have already been, starting on the following reporting date, but not on the current reporting date.

In step 918, a rebalance status is determined and applied. If the cell has a rebalance type Y, as indicated by the corresponding cell parameter, then TAV6 is divided into five SAVi7's in the following manner:

$$SAVi7=TAV6*SAViP$$

However, if the cell is rebalance type N then SAVi7 equals SAVi6. Regardless of the rebalance type, the values of TAV7, GRB7 and PB7 are equal to TAV6, GRB6, and PB6 respectively. Furthermore, if a cell is rebalance type N, its allocation changes each reporting date after the first reporting date with index performances only; if it is rebalance type Y, its allocation changes each reporting date after the first reporting date with both index performance and rebalancing actions as defined above. However, in some instances a rebalance may not be required, in such instances determining a rebalance status in step 918 may be skipped.

Finally, the cash settlement amount is determined in step 920. First the amount party B owes to party A ("H") and the amount party A owes to party B ("B") values are determined. Wherein, party A is the insurance provider and party B is the derivative counterparty. The H and B values are computed respectively as follows:

$$H=F*Q*TAV7/12$$

$$B=C*Q$$

If H>B, then party B pays party A a cash settlement amount equal to H−B at the immediately following cash settlement payment date If H<B, then party A pays party B a cash settlement amount equal to B−H at the immediately following Cash settlement payment Date.

If H=B, exactly the cash settlement amount at the immediately following cash settlement payment date is zero.

All of the above calculations are done for each cell, as well as summed, and the actual cash settlement amount in respect of a cash settlement payment date is based on the aggregate result across all cells. The procedure ends in step 924, upon the completion of the procedures depicted in FIG. 9, the beginning of the month asset cells 902 become end of the month asset cells 922.

Figure 10:
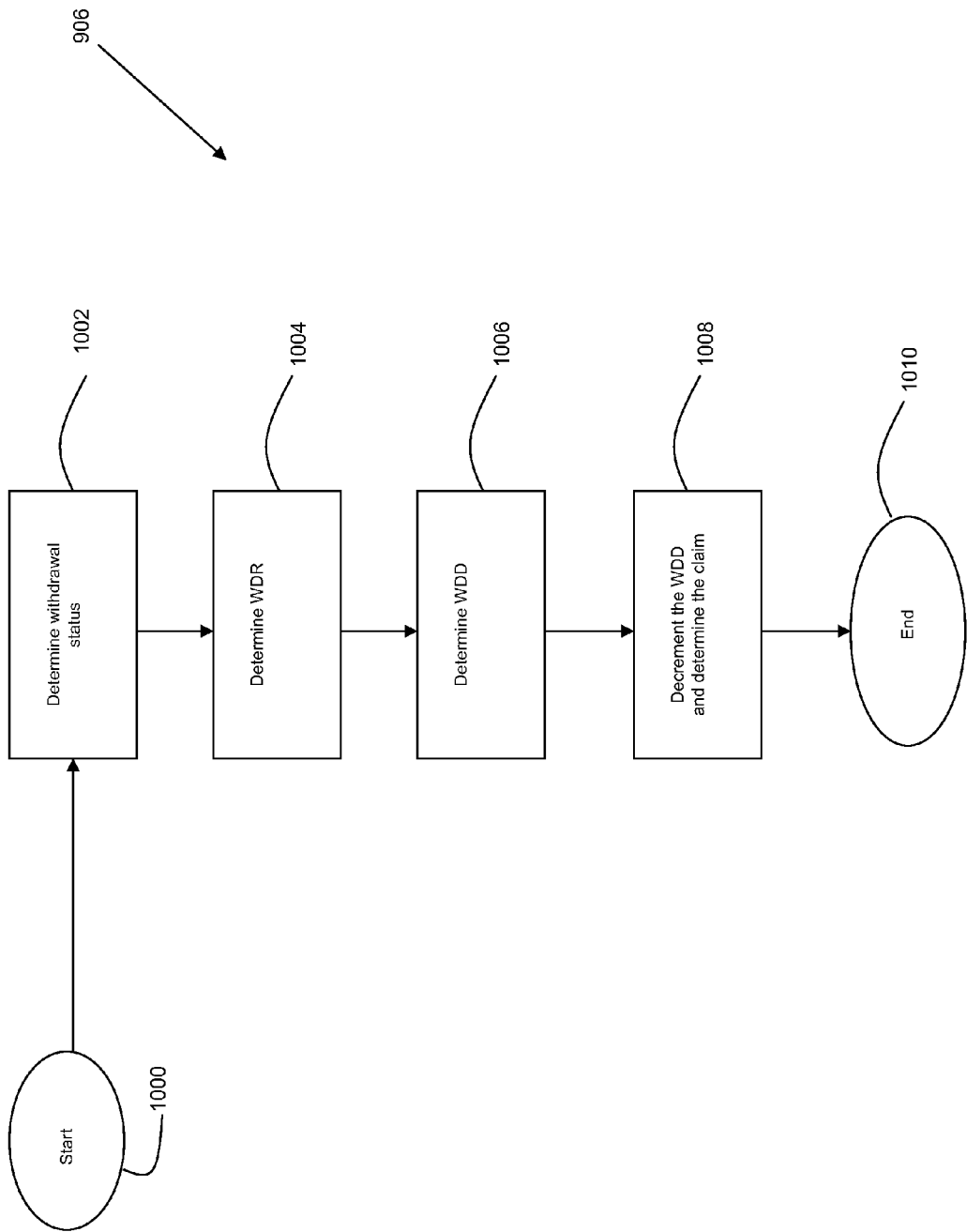
FIG. 10 is a flow chart depicting the determination and decrementing of the withdrawal dollars, and determination of the claim in accordance with an embodiment of the present invention.

FIG. 10 depicts the procedures of step 906, namely the determination and decrementing of the WDD, and determining the claim 906. First, the procedure starts in step 1000, the withdrawal status is determined in step 1002. Each cell is defined as one of five WD Types, with WD rules based, in part, on duration, as shown in the table below. For example, the value of duration is increased one (1) month every reporting date after the first reporting date. Once a cell starts withdrawing, it does not stop withdrawing until there is no more GRB to be withdrawn.

| WD Type | WD Rule |
|---------|---------|
| A | This WD Type withdraws immediately. |
| B | This WD Type withdraws stating at Duration 37. |
| C | This WD Type starts withdrawing at the earlier of Duration 73 or when TAV1 is equal to or less than 56.67% of GRB1. |
| D | This WD Type starts withdrawing at the earlier of Duration 125 or when the TAV1 is equal to or less than 56.67% of GRB1. |
| E | This cell never withdraws. |

Using the above table, it becomes apparent that if a cell is not withdrawing this reporting date, then it is not in withdrawal status. However, if a cell is withdrawing this reporting date, it is in withdrawal status.

In step 1004 the WDR is determined. Each cell has a WDR type: H, L or Z. H stands for high, and indicates a 7% WDR. L stands for low, and indicates a 4.5% WDR, unless the cell entered claims status in a prior reporting date. If a WDR type L cell enters claims status this reporting date, then in the next reporting date (not the reporting date it enters claims status) and in all later reporting dates, the cell will have a WDR of 7%. WDR type Z has a WDR of 0%.

In step 1006 the WDD is determined. If the cell is not in withdrawal status the WDD value is equal to zero (0). However, if the cell is in withdrawal status the WDD value is evaluated by computing the equation below:

$$WDD=Min[GRB1,(WDR/12)*PB1]$$

In step 1008, the WDD is decremented and the claim (if any) is determined. First, the TAV2 value is computed using the method below:

$$TAV2=Max(0,TAV1-WDD)$$

If the TAV2 value is zero (0), then the SAVi2 value is also zero. However, if the TAV2 value does not equal zero (0), the SAVi2 value is computed as follows:

$$SAVi2=SAVi1*(TAV2/TAV1)$$

If the claim is greater than zero (0) then the cell is in claim status. In order to determine whether the cell is in claim status the following method is used:

$$C=Max(0,WDD-TAV1)$$

Finally, the GRB and PB values are determined using the method outlined below, respectively:

the GRB is:

$$GRB2=Max(0,GRB1-WDD)$$

and the PB2 value is equal to PB1. Upon the completion of step 1008, the procedure ends in step 1010.

Figure 11:
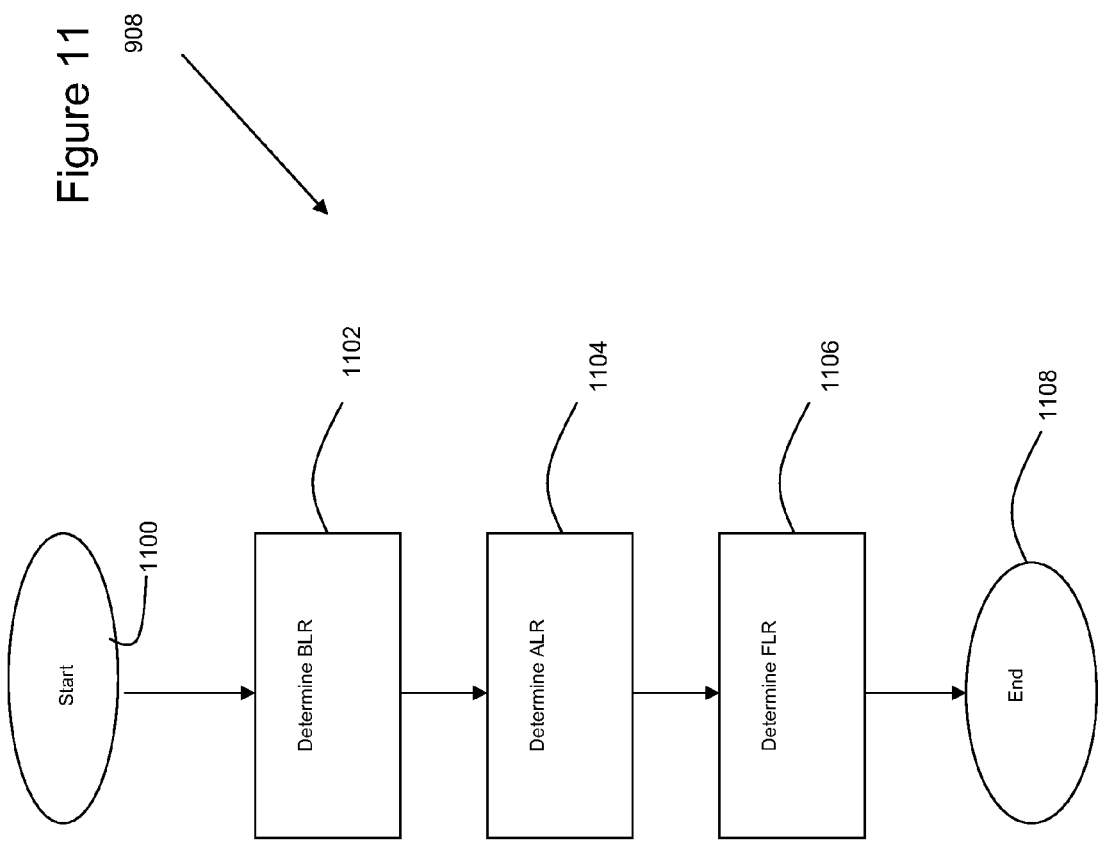
FIG. 11 is a flow chart depicting procedures involved in the determination of the lapse rate in accordance with an embodiment of the present invention.

FIG. 11 depicts the procedures of step 908. First, the procedure starts in step 1100, then in step 1102, the BLR is determined. The monthly core and monthly outlook BLR values in the chart below determine the BLR for the cell by using the product type of the cell, which is either core or outlook.

| Duration | Monthly Core | Monthly Outlook |
|----------|--------------|-----------------|
| 1-12 | 0.0837177359120589% | 0.0837177359120589% |
| 13-24 | 0.1682142552739570% | 0.1682142552739570% |
| 25-36 | 0.1682142552739570% | 0.1682142552739570% |
| 37-48 | 0.2535048613836690% | 0.3396053198917560% |
| 49-60 | 0.3396053198917560% | 2.3688424222606800% |
| 61-72 | 0.4265318777560640% | 1.3451947011868900% |
| 73-84 | 0.6029308066126890% | 1.0596241035319000% |
| 85-96 | 1.8423470126248300% | 0.8741610954696720% |
| 97-108 | 1.0596241035319000% | 0.8741610954696720% |
| 109-120 | 0.8741610954696720% | 0.8741610954696720% |
| 121+ | 0.8741610954696720% | 0.8741610954696720% |

Further, in step 1104, the ALR is determined. If the cell is in withdrawal status the ALR value is computed using the following method:

$$ALR=0.75*BLR$$

However, if the cell is not in withdrawal status the method for computing the ALR value is adjusted as follows:

$$ALR=1.05*BLR$$

In the next step, step 1106, the final lapse rate (FLR) is determined. If the cell is in claim status (i.e. GRB2=0 and TAV2=0), then the FLR will also equal zero (0). However, if TAV2 is less than or equal to GRB2 (i.e. TAV2 GRB2), then the FLR is defined as follows:

$$FLR=ALR*Min[1,TAV2/(GRB2*0.85)]$$

Furthermore, if the product type is core, and the duration≦84, or if the product type is outlook and the duration≦48, then the FLR is equal to ALR. However, if in this scenario the GRB2 is zero (0), then the FLR value is twice the ALR value (i.e. FLR=ALR*2).

In all other cases the FLR value is evaluated by computing:

$$FLR=ALR*Min\{2,Max[1,1+(TAV2-1.2*GRB2)/GRB2]\}$$

After the completion of step 1106, the procedure of FIG. 11 terminates in step 1108.

Figure 12:
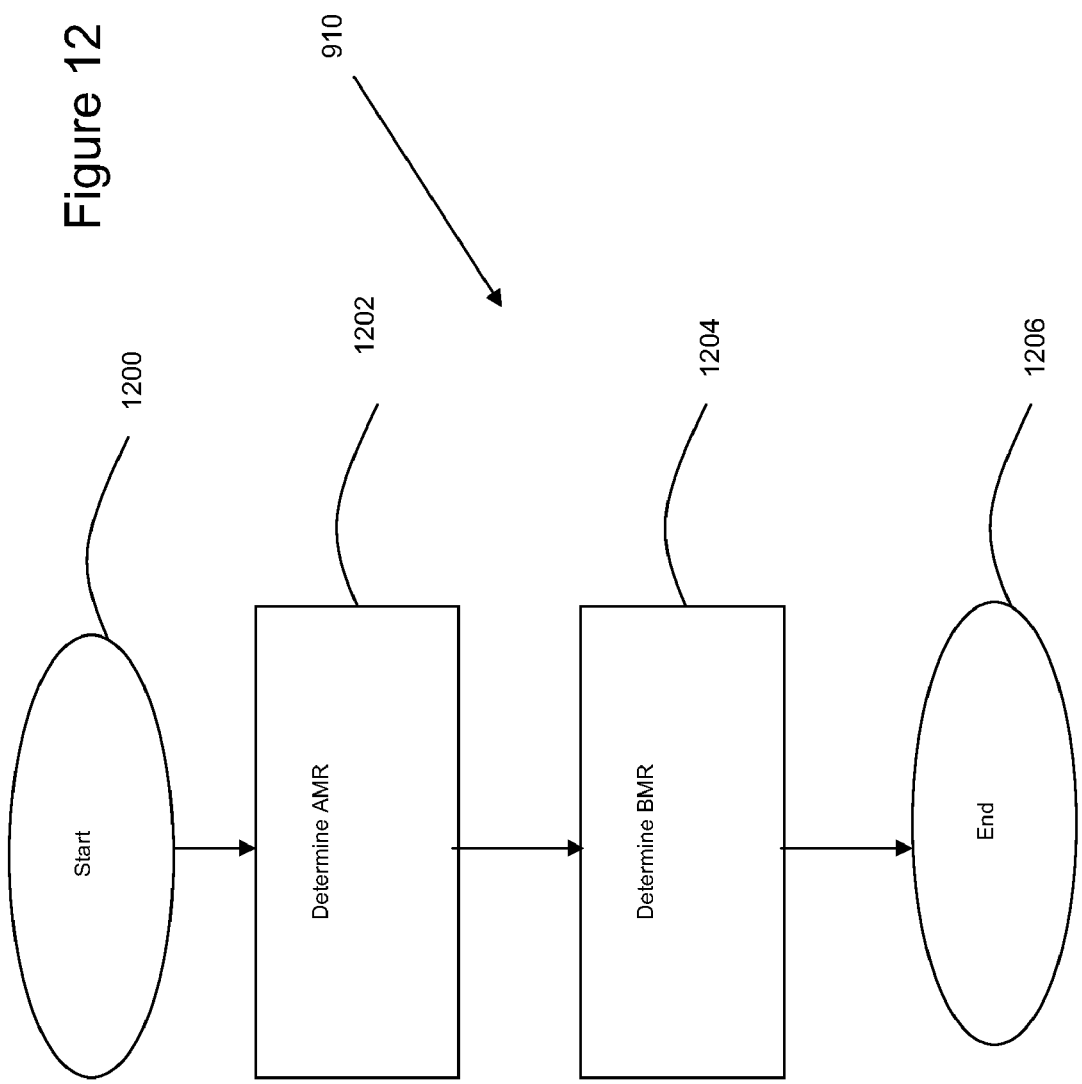
FIG. 12 is a flow chart depicting the determination of the mortality rate in accordance with an embodiment of the present invention.

FIG. 12 depicts the procedures of step 910. When the mortality rate is being determined in step 910, the procedure starts in step 1200, the AMR is first determined in step 1202. Age is increased $1/12$th of a year every reporting date after the first reporting date. The AMRs are listed in the table below as the male and female mortality rates on an annual basis. The AMRs are based on the attained age of the cell at, the time of calculation on an "age-last basis," meaning that the cell uses age x below if its age as of the current reporting date is greater than or equal to x but not greater than or equal to x+1.

| Age | Male AMR | Female AMR |
| --- | --- | --- |
| 50 | 0.31272% | 0.13176% |
| 51 | 0.34592% | 0.14344% |
| 52 | 0.38040% | 0.15592% |
| 53 | 0.41600% | 0.16960% |
| 54 | 0.45280% | 0.18520% |
| 55 | 0.49048% | 0.20328% |
| 56 | 0.52944% | 0.22424% |
| 57 | 0.57112% | 0.24824% |
| 58 | 0.61752% | 0.27544% |
| 59 | 0.67072% | 0.30568% |
| 60 | 0.73264% | 0.33928% |
| 61 | 0.80512% | 0.37624% |
| 62 | 0.89064% | 0.41680% |
| 63 | 0.99128% | 0.46152% |
| 64 | 1.10944% | 0.51088% |
| 65 | 1.24736% | 0.56512% |
| 66 | 1.40632% | 0.62536% |
| 67 | 1.58432% | 0.69448% |
| 68 | 1.77832% | 0.77616% |
| 69 | 1.98536% | 0.87376% |
| 70 | 2.20240% | 0.99080% |
| 71 | 2.42832% | 1.13024% |
| 72 | 2.66960% | 1.29280% |
| 73 | 2.93440% | 1.47848% |
| 74 | 3.23104% | 1.68736% |
| 75 | 3.56776% | 1.91936% |
| 76 | 3.95104% | 2.17480% |
| 77 | 4.38064% | 2.45376% |
| 78 | 4.85424% | 2.75672% |
| 79 | 5.37000% | 3.08392% |
| 80 | 5.92560% | 3.43560% |
| 81 | 6.51872% | 3.81240% |
| 82 | 7.14560% | 4.21528% |
| 83 | 7.80200% | 4.64568% |
| 84 | 8.48376% | 5.10456% |
| 85 | 9.18688% | 5.59344% |
| 86 | 9.93360% | 6.12560% |
| 87 | 10.70960% | 6.70960% |
| 88 | 11.52584% | 7.35480% |
| 89 | 12.38872% | 8.10832% |
| 90 | 13.30456% | 8.94000% |
| 91 | 14.25712% | 9.84608% |
| 92 | 15.23680% | 10.85040% |
| 93 | 16.24056% | 11.96616% |
| 94 | 17.43232% | 13.20824% |
| 95 | 18.72688% | 14.59352% |
| 96 | 19.87488% | 16.14056% |
| 97 | 21.11632% | 17.76352% |
| 98 | 22.46424% | 19.51192% |
| 99 | 23.93232% | 21.45480% |
| 100 | 25.53480% | 23.61496% |
| 101 | 27.28688% | 26.01800% |
| 102 | 29.20416% | 28.71176% |
| 103 | 31.44816% | 31.66744% |
| 104 | 34.18040% | 35.06880% |
| 105 | 37.56248% | 39.02528% |
| 106 | 41.75560% | 43.67088% |
| 107 | 46.92144% | 49.14472% |
| 108 | 53.22144% | 55.59080% |
| 109 | 60.81720% | 63.15792% |
| 110 | 100.00000% | 100.00000% |

Further, in step 1204 the BMR is determined. The BMR is determined by computing the following formula:

$$BMR = 1 - [1 - (PM)^*(\text{Male AMR}) - (1-PM)^*(\text{Female AMR})]^{(1/2)}$$

This BMR applies whether or not the cell is in claims status. The formula above is a simplification of blending that intentionally ignores any future changes in the percentage survivorship of males versus females that would change the blending ratios. The blending ratios remain as defined above. After the completion of step 1204, the procedures of FIG. 12 terminate in step 1206.

Figure 13:
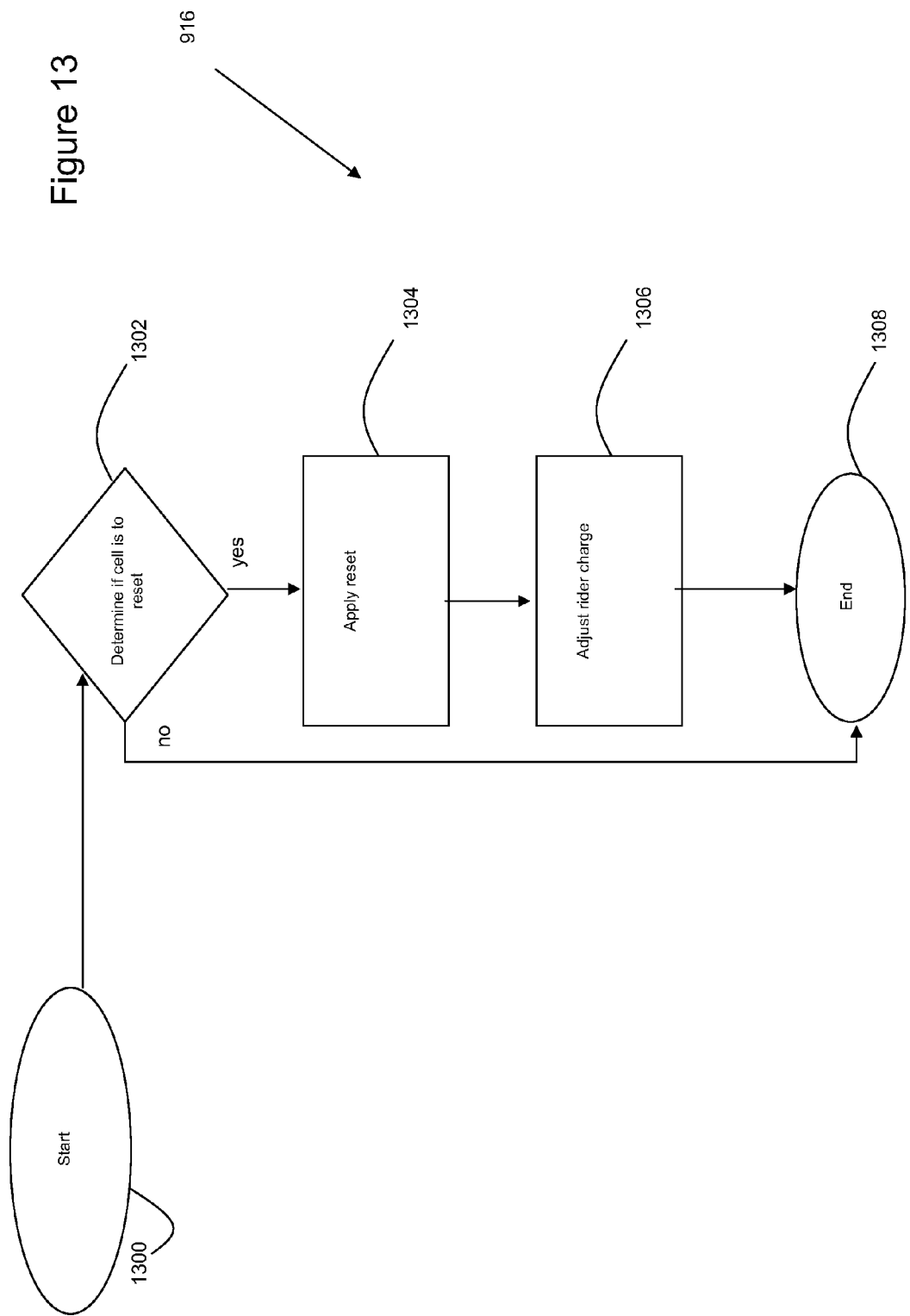
FIG. 13 is a flow chart depicting the reset subroutine in accordance with an embodiment of the present invention.

FIG. 13 depicts the procedures of step 916. When a reset subroutine is executed 916, the procedure starts in step 1300, then a determination is carried out if the cell is to be reset in step 1302, if a cell is not to be reset the procedure terminates in step 1308. If a reset is needed a reset is applied in step 1304, only if the value of the computation TAV5/GRB5 is greater than or equal to one added to the moneyness threshold. However, if a cell is reset eligible, and GRB5 is zero (0), then the cell will reset if it is reset type 1, 2, 3, 4 or 5, but it will not reset if it is reset type 6.

When a reset is applied, the TAV6 value is the same as the TAV5 value, and the SAVi6 value is equal to the SAVi5 value for the five (5) SAVi's. Furthermore, if a reset is applied the GRB6 and PB6 values are determined respectively, as follows:

GRB6=TAV6

PB6=Max(PB5,TAV6)

If a reset is not applied after step 914, then the GRB6 value is equal to the GRB5 value, and PB6 is equal to the PB5 values. Furthermore, the above formulas result in there being two ways a reset can increase withdrawals for the cell. Namely, the PB6 increases and/or the withdrawals are taken for a longer period of time. If the GRB5 has hit zero, the cell can still reset.

If a reset has occurred after step 914, in step 1306, a rider charge is adjusted. If a reset occurs then R for that cell becomes 50 bps, or 0.5%, which it may or may not have already been, starting on the following reporting date, but not on the current reporting date. After the completion of step 1306, the procedure of FIG. 13 terminates in step 1308.

Figure 14:
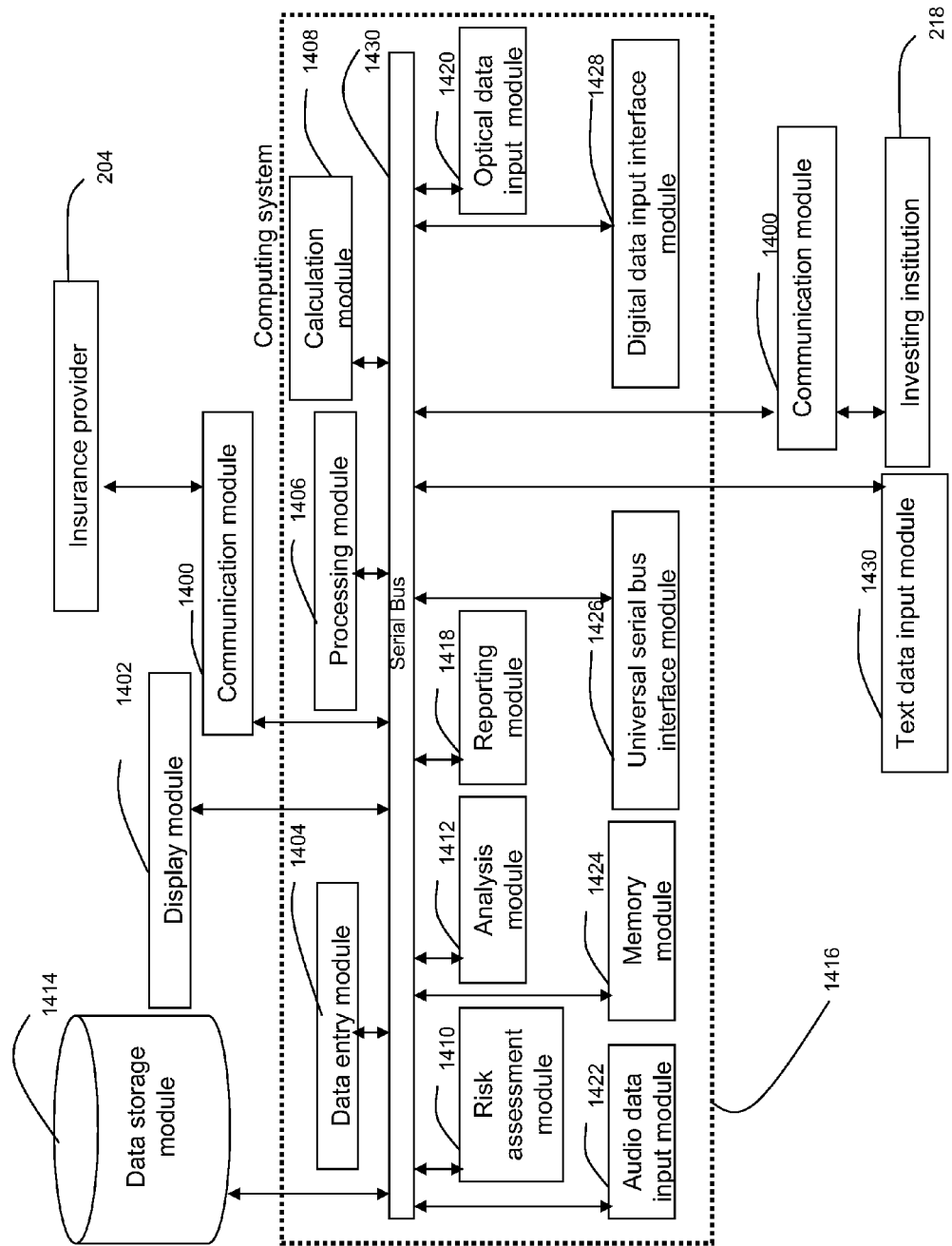
FIG. 14 is a diagram depicting the system on which the methods of the present invention may be implemented in accordance with an embodiment of the present invention.

FIG. 14 depicts an embodiment of a system on which the methods described above may be implemented. The present invention relates to an improved voluntary insurance product system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc. The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as: distributing the risks associated with an insurance instrument or financial instrument provided by an insurance provider or a financial institution to an individual or a group, grouping a plurality of insurance instruments or financial instruments into related cells, analyzing the behavior of the individual, group or financial instrument by the insurance provider, and modeling a separate derivative transaction to account for the market risks assumptions associated with each cell of the insurance instrument or financial instrument.

Additionally, suitable computer program code may be provided for performing the following functions: formulating behavioral and market risk assumptions about each cell of the insurance instrument or financial instrument, establishing the separate derivative transaction with a derivative counterparty, assuming by the derivative counterparty market risks associated with the insurance instrument or financial instrument. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

All of the modules described herein are operably interconnected via a bi-directional connection with a central serial bus 1430. The serial bus 1430 serves to receive information from every single module, as well as to transmit information from one module to another. The insurance provider 204 transmits and receives data, to and from the computing system 1416 via a communication module 1400. The communication module 1400 transmits and receives data, to and from the computing system 1416 via any standard electronic means known in the art. The computing system 1416 consists of: a display module 1402, a data entry module 1404, and a processing module 1406. The processing module 1406 may be used for dividing the risks associated with providing an insurance instrument to an individual or group into behavior risks and market risks, identifying the market risks for transfer outside of the insurance provider, formulating behavioral and market risk assumptions about an insurance instrument (wherein if the insurance instrument is divided into cells it may also be used for analyzing each cell), determining a cash settlement amount to be exchanged between an insurance provider, a reinsurance provider and a derivative counterparty (e.g. as payment for a derivative transaction) as well as guarantying by the derivative counterparty to the insurance provider a minimum return on investment.

The computing system 1416, additionally comprises a calculation module 1408, the calculation module 1408 may be used for modeling the risks associated with providing insurance to an individual or group, calculating a net fixed rate amount, modeling the insurance provider's exposure under the insurance instrument wherein behavior risks are separated from market risks, calculating the net amount of funds moved as a result of claims, as well as calculating data related to an administration of a trade. Importantly, the present invention may comprise a group of insurance instrument or non-insurance financial products. In such an instance, the group of insurance instruments may be grouped based at least in part on demographic characteristics, investment style, product chassis and rider design.

Furthermore, the computing system 1416 includes a risk assessment module 1410, wherein the risk assessment module 1410 may be used for assessing the risks associated with the issuance of an insurance instrument, and wherein the risks include market risks and behavior risks.

The computing system 1416 also includes a reporting module 1418 for making periodic reports regarding the status or performance of an insurance instrument or a financial product. Finally, the computing system includes an analysis module 1412. The analysis module 1412 is used for analysis of behavior of insured individuals as well as assessing the market risks associated with providing an insurance instrument.

The data storage module 1414 is external to the computing system 1416, for the purposes of allowing further controls of data access, to be implemented if needed. However, a data storage module 1414 which is internal to the computing system 1416 may be used without departing from the spirit of the present invention. Further, liability information for in force policies or financial products may be consolidated within the data storage module 1414. The computing system 1416 is further operably connected to a second communication module 1400, the communication module 1400 is in turn connected to the derivative counterparty 218. The derivative counterparty 218 receives and transfers information, from and to the insurance provider 204 via the communication module 1400. Furthermore, the second communication module 1400 may also used for passing market risks to any external party (e.g. a derivative counterparty), as well as transferring a cash settlement amount between the derivative counterparty and an insurance provider.

Additionally, the computing system 1416 includes: a text data input module 1430 for inputting data in the form of text, and an optical data input module 1420 for converting to digital format documents and images and inputting them into the computing system 1416.

Finally, the computing system 1416 includes: an audio data input module 1422 for receiving and inputting audio information, a memory module 1424 for temporarily storing information as it is being processed by the processing module 1406, a universal serial bus interface module 1426 for receiving and transmitting data to and from devices capable of establishing a universal serial bus connection, and a digital data input interface module 1428 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

Although the system described above has been depicted in terms of an insurance instrument, the system can also be used with a financial product.

Figure 15:
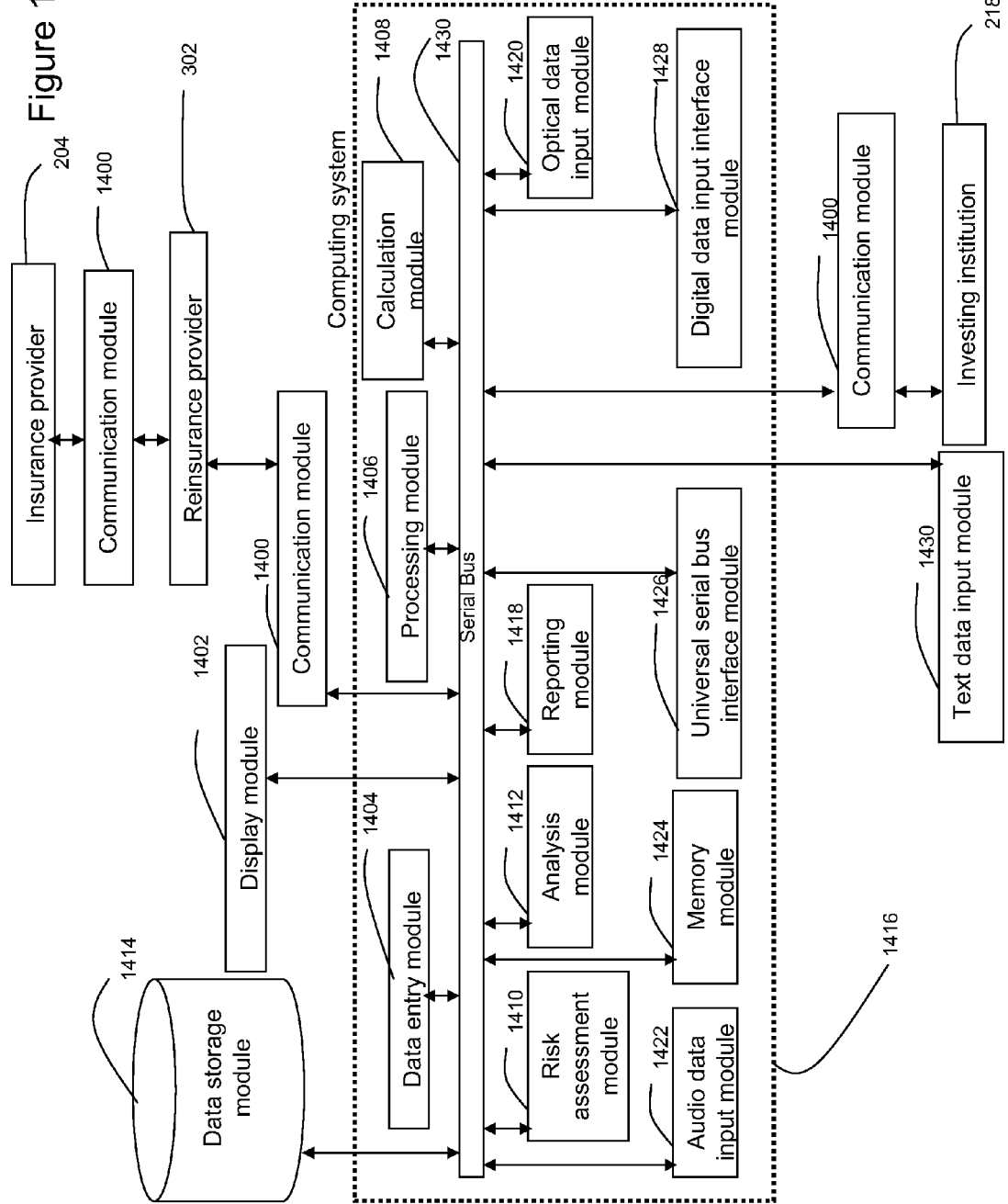
FIG. 15 is a diagram depicting an alternative system on which the methods of the present invention may be implemented in accordance with an embodiment of the present invention.

Alternatively, as depicted in FIG. 15, the insurance provider 204 may elect to transfer, or cede the risk that would be retained by the insurance provider 204 to a reinsurance provider 302. Wherein, the reinsurance provider 302 transmits and receives data, to and from the computing system 1416 via a communication module 1400. A second communication module 1400 transmits and receives data, between the computing system 1416 and the reinsurance provider 302 via any standard electronic means known in the art. The computing system 1416 consists of: a display module 1402, a data entry module 1404, and a processing module 1406. The processing module 1406 may be used for dividing the risks associated with providing an insurance instrument to an individual or group into behavior risks and market risks, identifying the market risks for transfer outside of the insurance provider, determining a cash settlement amount to be exchanged between an insurance provider, formulating behavioral and market risk assumptions about an insurance instrument (wherein if the insurance instrument is divided into cells it may also be used for analyzing each cell), a reinsurance provider and a derivative counterparty (e.g. as payment for a derivative transaction) as well as guarantying by the derivative counterparty to the insurance provider a minimum return on investment.

The computing system 1416 additionally comprises a calculation module 1408, the calculation module 1408 may be used for modeling the risks associated with providing insurance to an individual or group, calculating a net fixed rate amount, modeling the insurance provider's exposure under the insurance instrument wherein behavior risks are separated from market risks, calculating the net amount of funds moved as a result of claims, as well as calculating data related to an administration of a trade.

Furthermore, the computing system 1416 includes a risk assessment module 1410, wherein the risk assessment module 1410 may be used for assessing the risks associated with the issuance of an insurance instrument, and wherein the risks include market risks and behavior risks.

The computing system 1416 also includes a reporting module 1418 for making periodic reports regarding the status or performance of an insurance instrument or a financial product. Finally, the computing system includes an analysis module 1412. The analysis module 1412 is used for analysis of behavior of insured individuals as well as assessing the market risks associated with providing an insurance instrument.

The data storage module 1414 is external to the computing system 1416, for the purposes of allowing further controls of data access, to be implemented if needed. However, a data storage module 1414 which is internal to the computing system 1416 may be used without departing from the spirit of the present invention. Further, liability information for in force policies or financial products may be consolidated within the data storage module 1414. The computing system 1416 is further operably connected to a second communication module 1400, the communication module 1400 is in turn connected to the derivative counterparty 218. The derivative counterparty 218 receives and transfers information, from and to the insurance provider 204 via the communication module 1400. Furthermore, the second communication module 1400 may also used for passing market risks to any external party (e.g. a derivative counterparty, reinsurance provider, etc), as well as transferring a cash settlement amount between an insurance provider, a reinsurance provider and a derivative counterparty.

Additionally, the computing system 1416 includes: a text data input module 1430 for inputting data in the form of text, and an optical data input module 1420 for converting to digital format documents and images and inputting them into the computing system 1416.

Finally, the computing system 1416 includes: an audio data input module 1422 for receiving and inputting audio information, a memory module 1424 for temporarily storing information as it is being processed by the processing module 1406, a universal serial bus interface module 1426 for receiving and transmitting data to and from devices capable of establishing a universal serial bus connection, and a digital data input interface module 1428 for receiving data contained in digital storage devices (e.g. floppy disk, zip drive, 8 mm digital tape, etc).

Although the system described above has been depicted in terms of an insurance instrument, the system can also be used with a financial product.

Additionally, the systems described in FIGS. 14 and 15 may be used in a derivative transaction, by the derivative counterparty 218, the insurance provider 204 and reinsurance provider 302.

The systems described in FIGS. 14 and 15 may be used to generate and offer a group of insurance instrument or non-insurance financial products. In such an instance, the group of insurance instruments may be grouped based at least in part on demographic characteristics, investment style, product chassis and rider design.

The present invention in addition to being applied to all types of insurance can be applied to the general field of debt including mortgages, consumer debt, consumer loans, credit card debt, debit card debt, auto loans, corporate loans, corporate debt, lease management, debt consolidation, IRA, government loans, student loans, retirement loans, retirement accounts, and any type of money lending in general. While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

Although the invention described herein has been discussed in terms of an insurance policy for exemplary purposes, it can be equally applied to any other insurance instrument or non-insurance financial product. Furthermore, the invention described herein has been discussed in terms of an individual purchasing an insurance instrument for exemplary purposes, it can be equally applied to any individual or group purchasing an insurance instrument.

What is claimed is:

1. A computer system for processing data related to risks associated with a plurality of financial products issued by a financial entity, comprising:
a data storage device storing data related to said financial products, the data including risk related data;
a processor in communication with the data storage device, the processor configured to:
determine, based on data indicative of risk associated with the plurality of financial products, data indicative of a division of the risks associated with the plurality of financial products into behavior risks and market risks, the behavior risks being risks associated with activities of an individual or group in relation to one or more of said financial products and permissible thereunder; and
generate data indicative of identification of the market risks for transfer outside of the financial entity; and
a communications device in communication with the processor and configured to communicate data relating to a derivative contract for transferring the identified market risks associated with said financial products, independent of the behavior risks associated with said financial products, to a derivative counterparty.

2. The computer system of claim 1, wherein said group of financial products are grouped based at least in part on demographic characteristics, investment style, product chassis and rider design.

3. The computer system of claim 1, further comprising grouping the products into cells.

4. The computer system of claim 1, wherein the data relating to financial products comprises data relating to variable annuities, the data including guarantee data and owner data.

5. The computer system of claim 4, wherein the data relating to behavior risks comprises data relating to risks of one or more of lapse, mortality, withdrawal rates and exercise or non-exercise of step-up rights related to one or more guarantees.

6. The computer system of claim 4, wherein the data relating to market risks comprises data relating to risks associated with changes in policy account values and guaranteed minimum withdrawal benefits rights due to changes in performance of underlying stock and bond mutual funds in which policyholder funds are invested.

7. The computer system of claim 4, wherein the communications device is further configured to communicate data relating to ceding risks associated with the variable annuities to a computer system of a reinsurance provider.

8. A computer-implemented method for processing data related to risks associated with a plurality of financial instruments issued by a financial entity, comprising:
receiving via a communications network at a computer system data relating to financial instruments issued by the financial entity, the data comprising instrument type data and terms data, and storing the received data in a data storage device;
accessing by a processor of the computer system the received data relating to the financial instruments;
determining by the processor, based on data indicative of risk associated with the plurality of financial instruments, a division of the risks into behavior risks and market risks, the behavior risks being risks associated with activities of an individual or group in relation to one or more of said financial instruments and permissible thereunder;

associating by the processor with data indicative of the market risks data indicative of transfer outside of the financial entity identify the market risks for transfer outside of the financial entity; and communicating via a communications interface device data relating to a derivative contract for transferring the identified market risks, independent of the behavior risks, to a derivative counterparty.

9. The computer-implemented method of claim 8, further comprising generating by the processor data indicative of modeling of risk of the financial entity associated with said financial instruments wherein said behavior risks are separated from said market risks.

10. The computer-implemented method of claim 8, wherein the data relating to the financial instruments comprises data indicative of variable annuities having guaranteed benefits.

11. The computer-implemented method of claim 10, wherein the data indicative of variable annuities having guaranteed benefits comprises data indicative of variable annuities having guaranteed minimum death benefits.

12. The computer-implemented method of claim 10, wherein the data indicative of variable annuities having guaranteed benefits comprises data indicative of variable annuities having guaranteed minimum withdrawal benefits.

13. The computer-implemented method of claim 10, wherein the data relating to behavior risks comprises data relating to risks of one or more of lapse, mortality, withdrawal rates and exercise or non-exercise of step-up rights related to one or more guarantees.

14. The computer-implemented method of claim 8, wherein the data relating to financial instruments comprises data relating to consumer debt instruments.

15. The computer-implemented method of claim 14, wherein the data relating to financial instruments comprises data relating to mortgages.

16. A non-transitory computer readable medium having stored thereon a plurality of instructions, relating to processing data related to risks associated with a plurality of financial instruments issued by a financial entity, wherein the instructions, when executed by a processor, cause the processor to:

access via a communications bus a data storage device storing data related to said financial instruments, the data including risk related data;

determine, based on the accessed data, data indicative of a division of the risks associated with the plurality of financial instruments into behavior risks and market risks, the behavior risks being risks associated with activities of an individual or group in relation to one or more of said financial instruments and permissible thereunder;

generate data indicative of identification of the market risks for transfer outside of the financial entity; and transmit via a communications device in communication with the processor data relating to a derivative contract for transferring the identified market risks associated with the financial instruments, independent of the behavior risks associated with the financial instruments, to a derivative counterparty.

17. The non-transitory computer readable medium of claim 16, wherein the instructions, when executed by a processor, further cause the processor to allocate the financial instruments to cells based on one or more of demographic characteristics, investment style, product chassis and rider design.

18. The non-transitory computer readable medium of claim 16, wherein the data relating to the derivative contract comprises data relating to a cash settlement amount for payment to the derivative counterparty and an associated time period.

19. The non-transitory computer readable medium of claim 18, wherein the data relating to the financial instruments comprises data relating to variable annuities, and the data relating to determining the cash settlement amount employing mortality table data.

20. The non-transitory computer readable medium of claim 16, wherein the data relating to the financial instruments comprises data relating to variable annuities having guarantees of one or more of guaranteed minimum accumulation benefits, guaranteed minimum income benefits or guaranteed minimum withdrawal benefits.

\* \* \* \* \*